United States Patent
Janzen et al.

(10) Patent No.: US 12,197,616 B1
(45) Date of Patent: *Jan. 14, 2025

(54) ONLINE SOFTWARE PLATFORM (OSP) QUERYING CLIENT DATA ABOUT RELATIONSHIP INSTANCES FOR APPLICATION OF PERMISSION DIGITAL RULES IN ADDITION TO RESOURCE DIGITAL RULES FOR THE RELATIONSHIP INSTANCES

(71) Applicant: Avalara, Inc., Seattle, WA (US)

(72) Inventors: Mark Janzen, Wichita, KS (US); Gregory T. Kavounas, Bellevue, WA (US); Charles M. Morrisette, Everett, WA (US); Rohit Ghule, Pune Maharashatra (IN)

(73) Assignee: Avalara, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,521

(22) Filed: Jun. 15, 2023

Related U.S. Application Data

(63) Continuation of application No. 17/852,212, filed on Jun. 28, 2022, now Pat. No. 11,720,703, which is a continuation of application No. 17/188,910, filed on Mar. 1, 2021, now Pat. No. 11,403,419.

(60) Provisional application No. 62/985,261, filed on Mar. 4, 2020.

(51) Int. Cl.
*G06F 21/00* (2013.01)
*G06F 21/62* (2013.01)

(52) U.S. Cl.
CPC ........ *G06F 21/6227* (2013.01); *G06F 21/629* (2013.01)

(58) Field of Classification Search
None
See application file for complete search history.

(56) References Cited

U.S. PATENT DOCUMENTS

| | | |
|---|---|---|
| 5,335,169 A | 8/1994 | Chong |
| 6,236,365 B1 | 5/2001 | LeBlanc et al. |
| 6,993,502 B1 | 1/2006 | Gryglewicz et al. |
| 7,200,569 B2 | 4/2007 | Gallagher et al. |

(Continued)

FOREIGN PATENT DOCUMENTS

WO 2013/163625 A1 10/2013

OTHER PUBLICATIONS

"Sales and Transactions Checker for Economic Nexus," TaxJar, Feb. 19, 2019, https://www.taxjar.com/sales-and-transactions-checker/, 8 pages.

(Continued)

*Primary Examiner* — Maung T Lwin
(74) *Attorney, Agent, or Firm* — Jeremiah J. Baunach; Frontier IP Law PLLC

(57) ABSTRACT

Systems and methods electronically determine whether a dataset is permitted or excluded based on permission digital rules. Primary entities often are required, or choose to, exclude proposed relationship instances with secondary entities. The systems and methods described herein allow permission digital rules to be defined and applied to datasets obtained from secondary entities relating to a proposed relationship instance with the primary entity, and permit or exclude a resource from being produced for the dataset based on the permission digital rules.

21 Claims, 11 Drawing Sheets

(56) References Cited

U.S. PATENT DOCUMENTS

| | | | |
|---|---|---|---|
| 7,257,553 B1 | 8/2007 | Baker | |
| 7,337,910 B2 | 3/2008 | Cartmell et al. | |
| 7,516,242 B2 | 4/2009 | Furukawa et al. | |
| 7,606,741 B2* | 10/2009 | King | H04N 1/00363 |
| | | | 707/E17.022 |
| 7,783,536 B2 | 8/2010 | William et al. | |
| 7,933,803 B1 | 4/2011 | Nadler et al. | |
| 7,945,536 B2 | 5/2011 | Bao et al. | |
| 8,099,342 B1 | 1/2012 | Christian et al. | |
| 8,265,974 B2* | 9/2012 | Wadhwani | G06Q 10/00 |
| | | | 705/7.11 |
| 8,386,344 B2 | 2/2013 | Christian et al. | |
| 8,458,337 B2 | 6/2013 | Corley et al. | |
| 8,526,405 B2 | 9/2013 | Curtis et al. | |
| 8,528,047 B2 | 9/2013 | Terzis et al. | |
| 8,613,044 B2 | 12/2013 | Casey et al. | |
| 8,620,578 B1 | 12/2013 | Brown et al. | |
| 8,725,407 B2 | 5/2014 | Hurley et al. | |
| 8,751,399 B2 | 6/2014 | Kolhatkar et al. | |
| 8,849,862 B2 | 9/2014 | Visscher | |
| 8,904,493 B1 | 12/2014 | Dibble | |
| 9,101,834 B2 | 8/2015 | Letourneau et al. | |
| 9,323,428 B1* | 4/2016 | Maguire | G06F 3/0484 |
| 9,342,367 B2 | 5/2016 | Koneti et al. | |
| 9,613,190 B2 | 4/2017 | Ford et al. | |
| 9,734,169 B2* | 8/2017 | Redlich | G06F 16/21 |
| 9,760,915 B2 | 9/2017 | Pavlou et al. | |
| 9,762,553 B2 | 9/2017 | Ford et al. | |
| 10,033,702 B2 | 7/2018 | Ford et al. | |
| 10,043,035 B2 | 8/2018 | Lafever et al. | |
| 10,332,216 B2 | 6/2019 | Barsade et al. | |
| 10,374,968 B1* | 8/2019 | Duerk | G06F 9/5044 |
| 10,445,818 B1 | 10/2019 | Chowdhary | |
| 10,572,684 B2 | 2/2020 | Lafever et al. | |
| 10,572,953 B1 | 2/2020 | Char et al. | |
| 10,614,130 B1 | 4/2020 | Pai et al. | |
| 10,628,582 B1 | 4/2020 | Reybok et al. | |
| 10,764,254 B2 | 9/2020 | Ford et al. | |
| 10,769,611 B2 | 9/2020 | McNeel | |
| 10,789,590 B2 | 9/2020 | Tran et al. | |
| 10,872,100 B1 | 12/2020 | Shefferman et al. | |
| 10,997,251 B2 | 5/2021 | Tran et al. | |
| 11,030,341 B2 | 6/2021 | Lafever et al. | |
| 11,106,794 B2 | 8/2021 | Chow | |
| 11,176,620 B1 | 11/2021 | Lubczynski et al. | |
| 11,238,542 B1 | 2/2022 | Wixted et al. | |
| 11,455,410 B2* | 9/2022 | Turgeman | G06F 21/6245 |
| 11,475,430 B2 | 10/2022 | Burton et al. | |
| 11,514,448 B1 | 11/2022 | Liberman | |
| 11,632,419 B1 | 4/2023 | Robles et al. | |
| 11,853,302 B1 | 12/2023 | Nash et al. | |
| 2001/0005675 A1 | 6/2001 | Aho | |
| 2001/0034767 A1 | 10/2001 | Aho | |
| 2002/0116456 A1 | 8/2002 | Morita | |
| 2002/0138649 A1 | 9/2002 | Cartmell et al. | |
| 2002/0138765 A1 | 9/2002 | Fishman et al. | |
| 2003/0055754 A1 | 3/2003 | Sullivan | |
| 2003/0093320 A1 | 5/2003 | Sullivan | |
| 2003/0101112 A1 | 5/2003 | Gallagher et al. | |
| 2003/0144931 A1 | 7/2003 | Stokes et al. | |
| 2004/0004967 A1 | 1/2004 | Nakatsugawa et al. | |
| 2004/0083306 A1 | 4/2004 | Gloe | |
| 2004/0179539 A1 | 9/2004 | Takeda et al. | |
| 2004/0215707 A1 | 10/2004 | Fujita et al. | |
| 2005/0125335 A1 | 6/2005 | Bross et al. | |
| 2005/0255811 A1 | 11/2005 | Allen et al. | |
| 2006/0053208 A1 | 3/2006 | Laurila et al. | |
| 2006/0085275 A1 | 4/2006 | Stokes et al. | |
| 2006/0235776 A1 | 10/2006 | Temme | |
| 2006/0282900 A1 | 12/2006 | Johnson et al. | |
| 2007/0073892 A1 | 3/2007 | Laurila et al. | |
| 2007/0124294 A1 | 5/2007 | Sun et al. | |
| 2007/0136158 A1 | 6/2007 | Rawlings et al. | |
| 2007/0136159 A1 | 6/2007 | Rawlings et al. | |
| 2007/0136475 A1 | 6/2007 | Leppisaari et al. | |
| 2007/0203718 A1 | 8/2007 | Merrifield, Jr. | |
| 2007/0239464 A1 | 10/2007 | Carroll | |
| 2008/0104124 A1 | 5/2008 | Bao et al. | |
| 2008/0154754 A1 | 6/2008 | William et al. | |
| 2009/0006467 A1 | 1/2009 | Visscher | |
| 2009/0024698 A1 | 1/2009 | Ho et al. | |
| 2009/0067395 A1 | 3/2009 | Curtis et al. | |
| 2009/0076965 A1 | 3/2009 | Elson et al. | |
| 2009/0082008 A1 | 3/2009 | Thorell | |
| 2009/0138307 A1 | 5/2009 | Belcsak et al. | |
| 2009/0187500 A1 | 7/2009 | Wilson et al. | |
| 2009/0279455 A1 | 11/2009 | Wang et al. | |
| 2010/0095359 A1 | 4/2010 | Gordon | |
| 2010/0211634 A1 | 8/2010 | Song et al. | |
| 2011/0022485 A1 | 1/2011 | Von et al. | |
| 2011/0187864 A1 | 8/2011 | Snider | |
| 2012/0011518 A1 | 1/2012 | Duan et al. | |
| 2012/0179801 A1 | 7/2012 | Luna et al. | |
| 2012/0239731 A1 | 9/2012 | Shyamsunder et al. | |
| 2013/0013471 A1 | 1/2013 | Fishman | |
| 2013/0061179 A1 | 3/2013 | Alletto et al. | |
| 2013/0086380 A1 | 4/2013 | Krishnaswamy et al. | |
| 2013/0191883 A1 | 7/2013 | Tung | |
| 2013/0268357 A1* | 10/2013 | Heath | G06Q 10/10 |
| | | | 726/26 |
| 2013/0281115 A1 | 10/2013 | Dupray et al. | |
| 2013/0290200 A1 | 10/2013 | Singhal et al. | |
| 2013/0317944 A1 | 11/2013 | Huang et al. | |
| 2013/0346608 A1 | 12/2013 | Tung | |
| 2014/0094199 A1 | 4/2014 | Palanki et al. | |
| 2014/0172526 A1 | 6/2014 | Arrocho et al. | |
| 2014/0172656 A1 | 6/2014 | Shaw | |
| 2014/0222524 A1 | 8/2014 | Pluschkell et al. | |
| 2014/0289386 A1 | 9/2014 | Vatto et al. | |
| 2014/0337189 A1 | 11/2014 | Barsade et al. | |
| 2014/0351105 A1 | 11/2014 | Hamm | |
| 2015/0019591 A1 | 1/2015 | Visscher | |
| 2015/0058931 A1 | 2/2015 | Miu et al. | |
| 2015/0154717 A1 | 6/2015 | Stibel et al. | |
| 2015/0163206 A1 | 6/2015 | McCarthy et al. | |
| 2015/0310188 A1 | 10/2015 | Ford et al. | |
| 2016/0042466 A1 | 2/2016 | Herndon et al. | |
| 2016/0062949 A1 | 3/2016 | Smith et al. | |
| 2016/0099963 A1 | 4/2016 | Mahaffey et al. | |
| 2016/0140668 A1* | 5/2016 | Maguire | G06Q 40/123 |
| | | | 705/31 |
| 2016/0179874 A1 | 6/2016 | Lynch | |
| 2017/0041296 A1 | 2/2017 | Ford et al. | |
| 2017/0140471 A1 | 5/2017 | Hemberg et al. | |
| 2017/0142076 A1 | 5/2017 | Ford et al. | |
| 2017/0272316 A1 | 9/2017 | Johnson et al. | |
| 2017/0272485 A1 | 9/2017 | Gordon et al. | |
| 2017/0330121 A1 | 11/2017 | Sullivan et al. | |
| 2018/0096175 A1 | 4/2018 | Schmeling et al. | |
| 2018/0150647 A1 | 5/2018 | Naqvi et al. | |
| 2018/0176099 A1* | 6/2018 | Guo | H04L 67/10 |
| 2018/0246479 A1 | 8/2018 | Judd et al. | |
| 2018/0307859 A1 | 10/2018 | Lafever et al. | |
| 2018/0367506 A1 | 12/2018 | Ford et al. | |
| 2019/0114609 A1 | 4/2019 | Burton et al. | |
| 2019/0222560 A1 | 7/2019 | Ford et al. | |
| 2019/0332807 A1 | 10/2019 | Lafever et al. | |
| 2020/0117690 A1 | 4/2020 | Tran et al. | |
| 2020/0328951 A1 | 10/2020 | Ramprakash | |
| 2020/0349572 A1 | 11/2020 | O'Sullivan et al. | |
| 2020/0356974 A1 | 11/2020 | McNeel | |
| 2020/0387527 A1 | 12/2020 | Visscher | |
| 2020/0387896 A1 | 12/2020 | Tran et al. | |
| 2021/0082051 A1 | 3/2021 | Moses | |
| 2021/0158456 A1 | 5/2021 | Morgan et al. | |
| 2021/0233181 A1 | 7/2021 | Bubalo et al. | |
| 2023/0403337 A1 | 12/2023 | Kavounas et al. | |

OTHER PUBLICATIONS

"What is Nexus?" Sales Tax Institute, Aug. 26, 2019, https://www.salestaxinstitute.com/sales_tax_faqs/what_is_nexus, 6 pages.

(56) References Cited

OTHER PUBLICATIONS

Deseir, "Digital Transformation Challenges In Large and Complex Organizations", 2018.
Ellen Wixted et al., "Online Interactive Notification Platform for Exploring Possible Tax Nexus and Implications," USAN: U.S. Appl. No. 16/775,771, filed Jan. 29, 2020. (111 pages).
International Preliminary Report on Patentability received for PCT Patent Application No. PCT/US2021/040168, mailed on Jan. 12, 2023, 9 pages.
International Search Report and Written Opinion received for PCT Patent Application No. PCT/US2021/040168, mailed on Oct. 22, 2021, 10 pages.
Maccarrone, "The Impact of the U.S. Supreme Court's Decision in South Dakota v. Wayfair," 2021, retrieved from https://www.cpajournal.com/2021/04/26/the-impace-of-the-u-s-supreme-courts-decision-in-south-dakota-v-wayfair/, 11 pages.
Morgan et al., "Assembling Parameters to Compute Taxes for Cross-Border Sales," U.S. Appl. No. 16/696,062, filed Nov. 26, 2019, 75 pages.
Nash, Nikki, et al., "Automatically Starting Activities Upon Crossing Threshold", U.S. Appl. No. 17/338,220, filed Jun. 3, 2021, 107 pages.
Pichan et al., "Cloud Forensics: Technical Challenges, solutions, and comparative analysis", Digital Investigation, vol. 13, Jun. 2015, pp. 38-57.
Sales Tax Institute, "How do I know if I should be collecting tax in a state", Sales Tax Institute, Aug. 12, 2017, 2 pages.
Seth Therrien et al., "Tax Nexus Notification Platform," USAN: U.S. Appl. No. 16/585,829, filed Sep. 27, 2019. (72 pages).
Smith, "Due Process Implications Related to State Notice and Economic Nexus Laws," Tax Lawyer 70(4):833-868, 2017.
Stefan Kim et al., "Disestablishing Entity's Selected Resource Computation in Response to Loss of Nexus Establishment Condition for Selected Domain," USAN: U.S. Appl. No. 16/834,934, filed Mar. 30, 2020. (63 pages).
Taxconnex, "Sales Tax Nexus Guide", taxconnex, Whitepaper, 2019, 18 pages.
The Seller's Guide to eCommerce Sales Tax, TaxJar, Jun. 18, 2019, https://www.taxiar.com/guides/intro-to-sales-tax/, 19 pages.
Yetter, "Sales Tax Institute helps you understand sales and use tax obligations," YouTube Video, Dec. 15, 2011, URL= https://www.youtube.com/watch?v=gKFe1W062Ok&feature=emb_logo, download date Sep. 10, 2019, 1 page. (Screenshot).
Hu et al., "Game Theoretic Analysis for Offense - Defense Challenges of Algorithm Contests on TopCoder", 2015 IEEE Symposium on Science Oriented System Engineering Mar. 2015, IEEE Publiishing.

* cited by examiner

| PRIMARY ENTITY ID | PRIMARY ENTITY LOOKUP FIELD |
|---|---|
| PE1_ID | LF_PDR_PE1_ID |
| PE2_ID | LF_PDR_PE2_ID |
| PE3_ID | LF_PDR_PE3_ID |
| ... | ... |

ONLINE SOFTWARE PLATFORM (OSP) QUERYING CLIENT DATA ABOUT RELATIONSHIP INSTANCES FOR APPLICATION OF PERMISSION DIGITAL RULES IN ADDITION TO RESOURCE DIGITAL RULES FOR THE RELATIONSHIP INSTANCES

TECHNICAL FIELD

The technical field relates to computer networks, and particularly to networked automated systems for producing resources based on digital rules.

BRIEF SUMMARY

The present description gives instances of computer systems and storage media that may store programs and methods. Embodiments of the system may allow or block potential relationship instances between a primary entity and a secondary entity based on permission digital rules which are applied by an online service provider. By using an online service provider to allow or block possible relationship instances between a primary entity and secondary entity, the primary entity can devote less resources to determining whether a secondary entity can enter a relationship instance with a primary entity. Additionally, the online service provider is able to more efficiently and more quickly evaluate the viability of potential relationship instance based on the permission digital rules than a primary entity.

In addition, evaluating the permission digital rules by the online service provider allows the online service provider to immediately provide resources evaluated based on resource digital rules based on whether or not a dataset associated with the potential relationship instance is excluded by the permission digital rules. In various embodiments, the system may also check whether the secondary entity is identified in a list of secondary entities regarding allowing, or prohibiting, production of resources for secondary entities on the list. This allows the system to more quickly and accurately determine whether the dataset is excluded from being used to produce a resource associated with the proposed relationship instance due to the secondary entity being a participant in the relationship instance, by reducing the number of permission digital rules to be applied. Also, checking whether the secondary entity is on the list allows the system to access other datasets related to the secondary entity, and determine whether or not the dataset is excluded based on the other datasets related to the secondary entity. By checking whether or not a dataset related to the secondary entity has already been excluded, the system is able to use any previous datasets to determine whether the dataset is excluded, thus allowing the system to more quickly determine whether the dataset is excluded.

Therefore, the systems and methods described herein for determining whether a dataset is excluded based on permission digital rules improve the functioning of computer or other hardware, such as by reducing the processing, storage, and/or data transmission resources needed to perform various tasks, thereby enabling the tasks to be performed by less capable, capacious, and/or expensive hardware devices, enabling the tasks to be performed with less latency and/or preserving more of the conserved resources for use in performing other tasks or additional instances of the same task.

As shown above and in more detail throughout the present disclosure, the present disclosure provides technical improvements in computer networks to existing computerized systems to provide resources related to proposed relationship instances.

These and other features and advantages of the claimed invention will become more readily apparent in view of the embodiments described and illustrated in this specification, namely in this written specification and the associated drawings.

BRIEF DESCRIPTION OF THE DRAWINGS

The components in the drawings are not necessarily drawn to scale relative to each other. Like reference numerals designate corresponding parts throughout the several views.

DETAILED DESCRIPTION

As has been mentioned, the present description is about computer systems, storage media that may store programs, and methods. Embodiments are now described in more detail.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

Figure 1A:
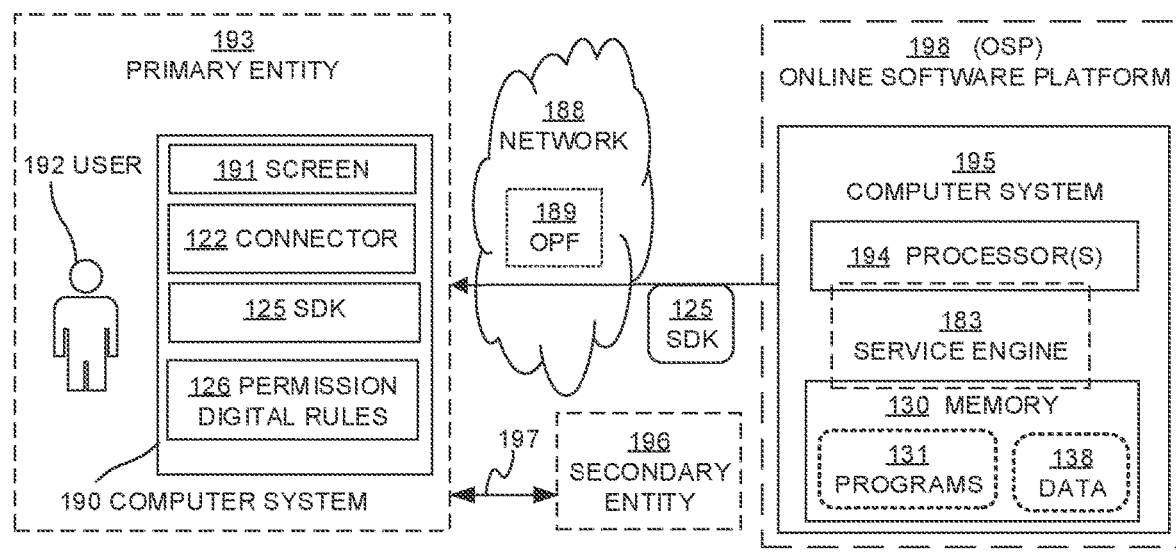
FIG. 1A is a diagram showing sample aspects of embodiments of the present disclosure involving a client receiving a software development kit (SDK) and also having client-side versions of permission digital rules (PDRs) that is an improvement in automated computerized systems.

FIG. 1A is a diagram showing sample aspects of embodiments of the present disclosure involving a client 193 receiving a software development kit (SDK) 125 and also having client-side versions of permission digital rules (PDRs) 126 that is an improvement in automated computerized systems. It will be appreciated however that, while versions of these PDRs 126 are shown client-side, the permission digital rules (PDRs) themselves may actually reside there, or with OSP 198, or elsewhere in network 188.

A sample computer system 195 according to embodiments is shown. The computer system 195 has one or more processors 194 and a memory 130. The memory 130 stores programs 131 and data 138. The one or more processors 194 and the memory 130 of the computer system 195 thus implement a service engine 183. One or more of the components of the computer system 195 may also be present in client computer system 190 of client 193 for performing the operations and implementing the functionality of computer system 190 described herein.

The computer system 195 can be located in "the cloud." In fact, the computer system 195 may optionally be implemented as part of an online software platform (OSP) 198. The OSP 198 can be configured to perform one or more predefined services, for example, via operations of the service engine 183. Such services can be, but are not limited to: generation and delivery of a software development kit (SDK) 125 for the client 193 to define permission digital rules, define permission lists, define exclusion lists, identify the format of resources when a dataset is excluded, searches, determinations, computations, verifications, notifications, the transmission of specialized information (including digital rules for estimating resources and data that effectuates payments, or remits resources), the generation and transmission of documents, the online accessing of other systems to determine digital rules, and so on, including what is described in this document. Such services can be provided as a Software as a Service (SaaS). The SDK 125 may be a collection of software development tools in one package installable by the client computer system 190. The SDK 125 may facilitate the definition of permission digital rules by having a compiler, debugger and a software framework. The SDK 125 may include libraries, documentation, code samples, processes, and guides that the client 193 can use and integrate with the connector 122 and other applications of the computer system 190 to facilitate the computer system 190 transmitting datasets and definitions of permission digital rules to the OSP 198.

A user 192 may be standalone. The user 192 may use a computer system 190 that has a screen 191, on which user interfaces (UIs) may be shown. In embodiments, the user 192 and the computer system 190 are considered part of a client 193, which can be referred to also merely as entity. In such instances, the user 192 can be an agent of the client 193, and even within a physical site of the client 193, although that is not necessary. In embodiments, the computer system 190 or other device of the user 192 or the client 193 are client devices for the computer system 195.

The computer system 190 may access the computer system 195 via a communication network 188, such as the internet. In particular, the entities and associated systems of FIG. 1A may communicate via physical and logical channels of the communication network 188. For example, information may be communicated as data using the Internet Protocol (IP) suite over a packet-switched network such as the Internet or other packet-switched network, which may be included as part of the communication network 188. The communication network 188 may include many different types of computer networks and communication media including those utilized by various different physical and logical channels of communication, now known or later developed. Non-limiting media and communication channel examples include one or more, or any operable combination of: fiber optic systems, satellite systems, cable systems, microwave systems, asynchronous transfer mode (ATM) systems, frame relay systems, digital subscriber line (DSL) systems, cable and/or satellite systems, radio frequency (RF) systems, telephone systems, cellular systems, other wireless systems, and the Internet. In various embodiments the communication network 188 can be or include any type of network, such as a local area network (LAN), a metropolitan area network (MAN), a wide area network (WAN), or the internet.

Downloading or uploading may be permitted from one of these two computer systems to the other, and so on. Such accessing can be performed, for instance, with manually uploading files, like spreadsheet files, etc. Such accessing can also be performed automatically. The computer system 190 and the computer system 195 may exchange requests and responses with each other. Such can be implemented with a number of architectures.

In one such architecture, a device remote to the service engine 183, such as computer system 190, may have certain data, such as a permission digital rules (PDRs) 126 and an associated connector 122 that is integrated with, sits on top of, or otherwise works with that certain data. The connector 122 may be able to fetch from a remote device, such as the computer system 195, the details required for the service desired from the OSP 198. The computer system 190 may receive, via network 188, an SDK 125 from the OSP 198, and/or the connector 122. The Primary Entity 193 may prepare and send the PDRs 126 as part of the SDK 125 automatically or in response to a request from the client computer system 190. In requesting services from the OSP 198, the client computer system 190 may form an object or payload, and then send or push a request that carries the payload to the service engine 183 via a service call. The service engine 183 may receive the request with the payload. The service engine 183 may then apply digital rules to the payload to determine a requested resource, including producing an estimate of a resource, form a payload that is an aspect of the resource (e.g., that includes the estimate) and then push, send, or otherwise cause to be transmitted a response that carries the payload to the connector 122. The connector reads the response, and forwards the payload to a certain application.

In some embodiments, the computer system 195 may implement a REST (Representational State Transfer) API (Application Programming Interface) (not shown). REST or RESTful API design is designed to take advantage of existing protocols. While REST can be used over nearly any protocol, it usually takes advantage of HTTP (Hyper Text Transfer Protocol) when used for Web APIs. In some embodiments, this architecture enables the client 193 to directly consume a REST API from their particular application without using a connector 122. The particular application of the remote device may be able to fetch internally from the remote device the details required for the service desired from the OSP 198, and thus send or push the request to the REST API. In turn, the REST API talks in background to the service engine 183. Again, the service engine 183 determines the requested resource and sends an aspect of it back to the REST API. In turn, the REST API sends the response that has the payload to the particular application.

As one example service the OSP 198 may provide to the client 193, the service engine 183 of the OSP may use digital rules to produce resources for the client 193. The OSP 198 may additionally use PDRs 126 to determine whether a resource should be produced for the client 193. Such PDRs may include permission digital rules 160 that may be used by the OSP to determine whether a dataset can be used to estimate resources for the client 193. These permission digital rules 160 can be used by the OSP 198 to permit or exclude resources from being produced for a client based on a potential relationship instance between the client and a secondary entity 196. For example, the permission digital rules 160 may include digital rules which, when evaluated by the OSP 198 in relation to a dataset related to a secondary entity, may exclude a resource from being produced for a client.

Moreover, in some embodiments, data from the computer system 190 and/or from the computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, any devices of the OPF 189 can be considered to be remote devices, from the perspective of the computer system 195 and/or client computer system 190.

In some instances, the user 192 or the client 193 may have instances of relationships with secondary entities. Only one such secondary entity 196 is shown. However, additional secondary entities may be present in various other embodiments. In this example, the client 193 has a relationship instance 197 with the secondary entity 196. In some embodiments, the secondary entity may also communicate with the client 193 via network 188.

In some instances, the user 192, the client 193 and/or one or more intermediary entities (not shown) may have data about one or more secondary entities, such as secondary entity 196, for example via relationship instances of the user 192 or client 193 with the secondary entity 196. The client 193 and/or the secondary entity 196 may be referred to as simply entities. One of these entities may have one or more attributes. Such an attribute of such an entity may be any one of its name, type of entity, a physical or geographical location such as an address, a contact information, an affiliation, a characterization of another entity, a characterization by another entity, an association or relationship with another entity (general or specific instances), an asset of the entity, a declaration by or on behalf of the entity, and so on.

Figure 1B:
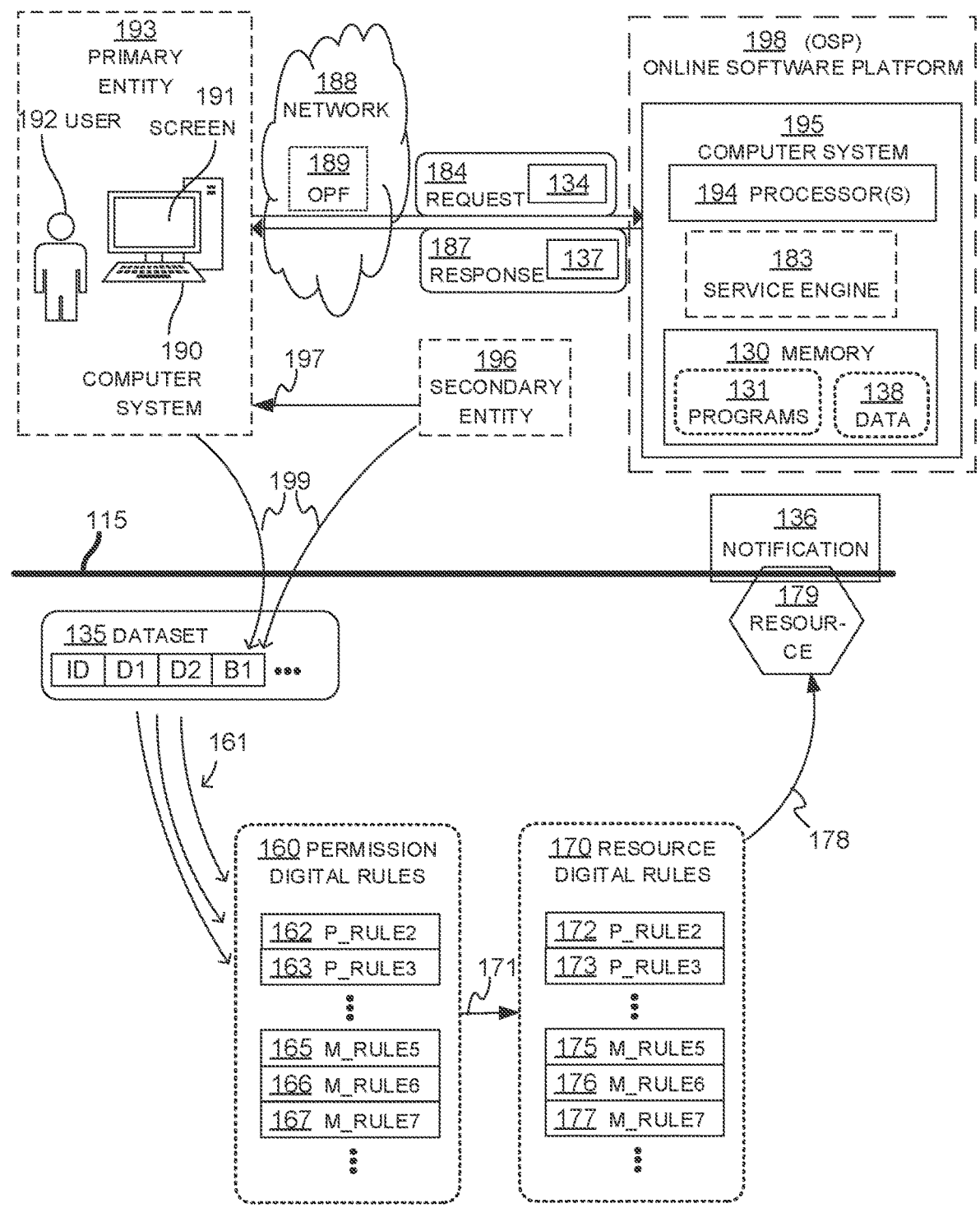
FIG. 1B is a diagram showing sample aspects of embodiments of the present disclosure involving determining whether or not a dataset should be excluded based on the PDRs, which is an improvement in automated computerized systems.

FIG. 1B is a diagram showing sample aspects of embodiments of the present disclosure involving determining whether or not a dataset should be excluded based on the Permission Digital Rules 160, which is an improvement in automated computerized systems.

A thick line 115 separates this diagram, although not completely or rigorously, into a top portion and a bottom portion. Above the line 115 the emphasis is mostly on entities, components, their relationships, and their interactions, while below it the emphasis is mostly processing of data that takes place often within one or more of the components above the line 115.

Above the line 115, the sample computer system 195, network 188, client computer system 190 and secondary entity 196 according to embodiments is shown. In embodiments, the computer system 190 generates one or more datasets. A sample generated dataset 135 is shown below the line 115. The dataset 135 has values that can be numerical, alphanumeric, Boolean, and so on, as needed for what the values characterize. For example, an identity value ID may indicate an identity of the dataset 135, so as to differentiate it from other such datasets. At least one of the values of the dataset 135 may characterize an attribute of a certain one of the entities 193 and 196. (It should be noted that the arrows 199 describe a correspondence, but not the journey of data in becoming the dataset 135.) For instance, a value D1 may be the name of the certain entity, a value D2 may be for relevant data of the entity, and so on. Plus, an optional value B1 may be a numerical base value for an aspect of the dataset, and so on. The aspect of the dataset may be the aspect of the value that characterizes the attribute, an aspect of the reason that the dataset was created in the first place, an indication of an identity or other characteristic of the client 193 and/or the secondary entity 196. The dataset 135 may further have additional such values, as indicated by the horizontal dot-dot-dot to the right of the dataset 135. In some embodiments, the dataset 135 has values that characterize attributes of each of the client 193 and the secondary entity 196, but that is not required.

In embodiments, stored PDRs 160 may be defined by a user 192 of the computer system 190. The PDRs 160 are digital in that they are implemented for use by software. For example, the PDRs 160 may also be stored and utilized by the OSP 198 to determine whether a dataset should be excluded. The OSP 198 may access the PDRs 160 responsive to receiving a dataset, such as the dataset 135. The PDRs 160 may include main rules, which can thus be accessed by the OSP 198. In this example, three sample permission digital main rules are shown explicitly, namely M_RULE5 165, M_RULE6 166, and M_RULE7 167. In this example, the PDRs 160 also include permission digital precedence rules P_RULE2 162 and P_RULE3 163, which can thus be further accessed by the computer system 190. The PDRs 160 may include additional rules and types of rules, as suggested by the vertical dot-dot-dots.

In embodiments, a certain one of the permission digital main rules may be identified from among the accessed stored PDRs 160 by the OSP 198. In particular, values of the dataset 135 can be tested, according to arrows 161, against logical conditions of the permission digital main rules. In this example, the certain main rule M_RULE6 166 is thus identified, which is indicated also by the beginning of an arrow 171. Identifying may be performed in a number of ways, and depending on how the permission digital main rules are implemented.

Where more than one of the permission digital main rules are found that could be applied, there are additional possibilities. For instance, the computer system 190 of FIG. 1B may further access at least one stored permission digital precedence rule, such as P_RULE2 162 or P_RULE3 163. Accordingly, the certain permission digital main rule may be thus identified also from the permission digital precedence rule. In particular, the permission digital precedence rule may decide which one or more of the permission digital main rules is to be applied. To continue the previous example, if an attribute, or attributes, of a secondary entity identified by the dataset 135 may apply to multiple permission digital rules, the permission digital precedence rule may decide that all of them are to be applied, or less than all of them are to be applied.

A number of examples are possible for how to recognize that a certain condition of a certain permission digital rule is met by at least one of the values of the dataset 135. For instance, the certain condition could indicate attributes of a secondary entity. In various embodiments, the attributes may be related to past transactions involving the secondary entity. The attributes may be related to the legitimacy of past transactions involving the secondary entity, attributes describing the nature of the secondary entity itself, an amount of time since a dataset was received from a secondary entity, the relationship between the secondary entity and other primary entities, etc. In some embodiments, one or more of such conditions may be defined, implemented or otherwise indicated by the permission digital precedence rules, such as permission digital precedence rules P_RULE2 162 and P_RULE3 163. In other instances, the PDRs 160 include permission lists, exclusion lists, or both, which the OSP 198 consults to determine whether the dataset should be permitted for, or excluded from, producing a resource. In various embodiments, where a set of PDRs 160 are being applied to a dataset 135, and a PDR indicates that a dataset should be excluded or included, the OSP 198 halts the application of PDRs and includes or excludes the dataset accordingly.

In embodiments, stored Resource Digital Rules (RDRs) 170 may be accessed by the OSP 198. The RDRs 170 are digital in that they are implemented for use by software. For example, the RDRs 170 may be implemented within the OSP 198. The OSP 198 may access the RDRs 170 responsive to a determination that a dataset, such as the dataset 135, is permitted. The RDRs 170 may include main rules, which can thus be accessed by the OSP 198. In this example, three sample resource digital main rules are shown explicitly, namely M_RULE5 175, M_RULE6 176, and M_RULE7 177. In this example, the RDRs 170 also include resource digital precedence rules P_RULE2 172 and P_RULE3 173, which can thus be further accessed by the OSP 198. The RDRs 170 may include additional rules and types of rules, as suggested by the vertical dot-dot-dots.

In embodiments, a certain one of the resource digital main rules may be identified from among the accessed stored RDRs 170 by the OSP 198. In particular, values of the dataset 135 can be tested, according to arrow 171, against logical conditions of the resource digital main rules. In this example, the certain main rule M_RULE6 176 is thus identified, which is indicated also by the beginning of an arrow 178. Identifying may be performed in a number of ways, and depending on how the digital main rules are implemented.

A number of examples are possible for how to recognize that a certain condition of a certain resource digital rule is met by at least one of the values of the dataset 135. For instance, the certain condition could indicate a domain defined by boundary of a region that is within a space. In various embodiments, a domain may be a region defined by a boundary as discussed above or may be an entity representing or otherwise associated with the region. The region could be geometric, and be within a larger space and may include political boundaries. For example, the region could be geographic, within the space of a city, a county, a state, a country, a continent or the earth. The boundary of the region could be defined in terms of numbers according to a coordinate system within the space. In the example of geography, the boundary could be defined in terms of groups of longitude and latitude coordinates. In such embodiments, the certain condition could be met responsive to the characterized attribute of the dataset being in the space and within the boundary of the region instead of outside the boundary. For instance, the attribute could be a location of the client 193, and the one or more values of the dataset 135 that characterize the location could be one or more numbers or an address, or longitude and latitude. The condition can be met depending on how the one or more values compare with the boundary. For example, the comparison may reveal that the location is in the region instead of outside the region. The comparison can be made by rendering the characterized attribute in units comparable to those of the boundary. For example, the characterized attribute could be an address that is rendered into longitude and latitude coordinates, and so on. In other instances, instead of rendering the characterized attribute in units comparable to those of the boundary, the OSP 198 may instead consult a more coarse value, which maps an aspect of the address, such as zip code, to a parameter value associated with the zip code, such as rate to use in calculating the local estimate.

Where more than one of the resource digital main rules are found that could be applied, there are additional possibilities. For instance, the computer system 190 of FIG. 1B may further access at least one stored resource digital precedence rule, such as P_RULE2 172 or P_RULE3 173. Accordingly, the certain resource digital main rule may be thus identified also from the resource digital precedence rule. In particular, the resource digital precedence rule may decide which one or more of the resource digital main rules is to be applied. To continue the previous example, if a value of the dataset 135 that characterizes a location, and the location is within multiple overlapping regions according to multiple rules, the digital precedence rule may decide that all of them are to be applied, or less than all of them are to be applied.

In embodiments, an estimated resource may be produced for the dataset 135, by the OSP 198 applying the certain consequent of the certain digital main rule. The resource can be a computational result, a document, an item of value, a representation of an item of value, etc., made, created or prepared for the user 192, the client 193, the secondary entity 196, etc., on the basis of the attribute. As such, in some embodiments, the estimated resource is produced by a determination and/or a computation. In the example of FIG. 1B, an estimated resource may be produced after an OSP 198 determines that the dataset is excluded or permitted. This may be performed by the OSP 198 applying PDRs 160, followed by RDRs 170, arrows 171 and 178.

The PDRs may be applied in a number of ways. For example, a primary entity 193 may specify that a dataset is either permitted or excluded if a secondary entity 196 is included in a predetermined list. The dataset may also be permitted or excluded based on certain events, or relationship instances, involving the secondary entity which occurred within a predetermined time period. As another example, the dataset may be permitted or excluded based on a secondary entity's 196 interaction with a primary entity other than the primary entity 193.

As mentioned above, in some embodiments two or more permission digital main rules, resource digital main rules, or both, may be applied. For instance, the OSP 198 may recognize that an additional condition of an additional one of the accessed RDRs 170 is met by at least one of the values of the dataset 135. Also, the OSP 198 may apply multiple PDRs 160 to determine whether the dataset 135 is permitted or excluded. The OSP 198 may halt the application of PDRs 160 to the dataset 135 once at least one of the PDRs 160 permits or excludes the dataset.

In embodiments, a resource may be produced for the dataset, by the computer system applying the certain consequent of the certain resource digital main rule. The resource can be a computational result, a document, etc., made, created or prepared for the user 192, the primary entity 193, the secondary entity 196, etc., on the basis of the attribute. As such, in some embodiments, the resource is produced by a determination and/or a computation. In the example of FIG. 1B, a resource 179 is produced for the dataset 135, by the OSP 198 applying the certain M_RULE6 176 as indicated by the arrow 178. In embodiments, the OSP 198 obtains a variation of an attribute of the resource, such as a negative of a base value, when the PDRs 160 indicate that the dataset 135 is to be excluded.

The resource may be produced in a number of ways. For example, the certain consequent can be applied to one of the values of the dataset 135. For instance, one of the values of the dataset 135 can be a numerical base value, e.g., B1, that encodes an aspect of the dataset 135, as mentioned above. In such cases, applying the certain consequent may include performing a mathematical operation on the base value B1. For example, applying the certain consequent may include multiplying the base value B1 with a number indicated by the certain consequent. Such a number can be, for example, a percentage, e.g., 1.5%, 3%, 5%, and so on. Such a number can be indicated directly by the certain rule, or be stored in a place indicated by the certain rule, and so on.

In embodiments, a notification 136 can be caused to be presented on the screen 191, by the computer system 190. The notification 136 can include the resource 179 and/or be about an aspect of the resource 179. In the example of FIG. 1B, a notification 136 can be caused to be transmitted to the computer system 195, for example, as an answer or other response to the received dataset 135. The notification 136 can be about an aspect of the resource 179. In particular, the notification 136 may inform about the aspect of the resource 179, namely that it has been determined, where it can be found, what it is, or at least a portion or a statistic of its content, a rounded version of it, whether the dataset has been excluded or permitted, and so on. Of course, the planning should be that the recipient of the notification 136 understands what it is being provided.

The notification 136 can be transmitted to one of an output device and another device. The output device may be the screen of a local user, such as screen 191, or a remote user. The notification 136 may thus cause a desired image, message, or other such notification to appear on the screen, such as within a Graphical User Interface (GUI) and so on. The other device can be the remote device, from which the dataset 135 was received.

Figures 2A, 2B:
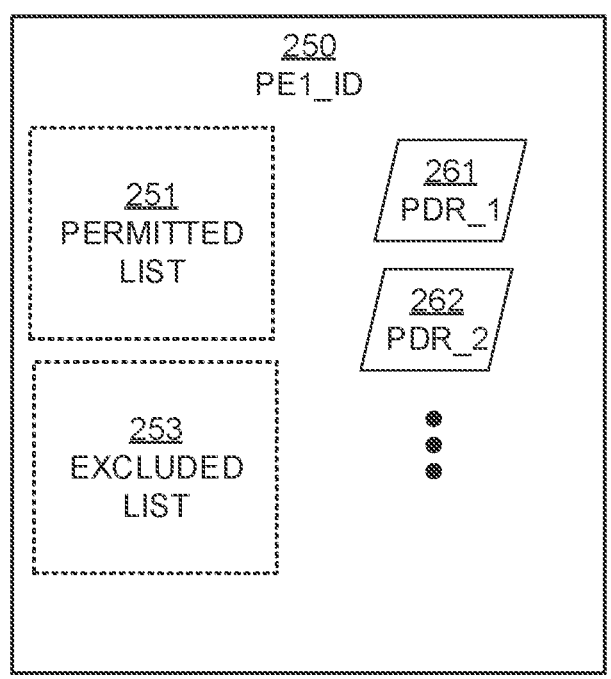
FIG. 2A is a diagram showing sample aspects of embodiments of the present disclosure involving a table storing primary entity data, which is an improvement in automated computerized systems.
FIG. 2B is a diagram showing sample aspects of embodiments of the present disclosure involving primary entity data, including PDRs and lists of permitted or excluded entities, which is an improvement in automated computerized systems.

FIG. 2A is a diagram showing sample aspects of embodiments of the present disclosure involving a table 201 storing primary entity data, which is an improvement in automated computerized systems. The table 201 includes a primary entity id column 211 and a primary entity lookup field column 212. The primary entity id column 211 stores identifiers, one for each of a plurality of primary entities that the OSP has stored data for. The primary entity lookup field column 212 stores an indicator of a location of the data related to the primary entity identified in the primary entity id column 211 is stored, which may include within the memory of the OSP, within an external database, a combination of the two, etc. Each of the rows 220-222 of the table 201 includes sample data indicating a primary entity. The table 201 may include additional rows, as indicated by the horizontal dot-dot-dots in the final rows of the primary entity id column 211 and primary entity lookup field column 212.

FIG. 2B is a diagram showing sample aspects of embodiments of the present disclosure involving primary entity data 250, including PDRs and lists of permitted or excluded entities, which is an improvement in automated computerized systems. The primary entity data 250 includes PDRs 261 and 262. The primary entity data 250 may include additional PDRs as indicated by the vertical dot-dot-dots of FIG. 2B. The PDRs 261 and 262 may be obtained from a primary entity, such as by using a user interface or software configured to operate in conjunction with an SDK. In various embodiments, the primary entity data 250 includes a permitted list 251, an excluded list 253, or both. The permitted list 251 is a list of secondary entities for which the OSP is permitted to produce a resource when the dataset indicates a secondary entity in the list. The excluded list 253 is a list of secondary entities for which the OSP excludes from producing resource when the dataset indicates a secondary entity in the list. In various embodiments, the permitted list 251, excluded list 253, or both, are populated based on permission digital rules defined by the primary entity. The primary entity may specify certain secondary entities to be included in the permitted list 251, excluded list 253, or both lists. The OSP may add a secondary entity to a list based on the application of permission digital rules to a dataset indicating the secondary entity.

The OSP 198 described with respect to FIGS. 1A-2B may receive a dataset indicating a proposed relationship instance between a primary entity and a secondary entity. The OSP 198 may identify the primary entity and the secondary entity from the dataset. The OSP 198 may look up one or more permission digital rules 160 regarding the secondary entity provided by the primary entity for determining whether the dataset is excluded from being used to produce a resource associated with the proposed relationship instance due to the secondary entity being a participant in the relationship instance. The OSP 198 may determine whether or not the dataset is thus excluded based on the looked-up permission digital rules and the dataset. If the OSP 198 determines the dataset is not excluded, the OSP 198 may use the dataset to produce a resource associated with the proposed relationship instance by applying to the dataset resource digital rules that are different from the permission digital rules and include the produced resource in a response. If the OSP 198 determines the dataset is excluded, the OSP 198 may include an indication of the exclusion in a response. The OSP 198 may transmit the response to the primary entity.

In some embodiments, determining whether or not the dataset is thus excluded from being used includes checking whether or not the secondary entity is identified on an available list of secondary entities regarding allowing or prohibiting production of resources associated with relationship instances involving the secondary entities on the list. Determining whether or not the dataset is thus excluded may include, based on the results of checking whether or not the secondary entity is identified on the list of secondary entities, accessing other datasets that indicate other relationship instances, identifying at least one dataset of the other datasets that indicates the secondary entity was a participant in a relationship instance indicated by the at least one dataset, and checking the at least one dataset based on parameters of the looked-up rules to determine whether or not the dataset is excluded from being used to produce the resource.

In some embodiments, the OSP 198 may obtain an indication of the one or more permission digital rules from the primary entity.

In some embodiments, identifying the primary entity may include parsing the dataset. Identifying the primary entity may include determining a sender of the dataset.

In some embodiments, the OSP 198 determines whether or not the primary entity has provided permission digital rules for determining whether or not the dataset is thus excluded. If it is determined that the primary entity has not provided any permission digital rules, then instead of the looking up one or more permission digital rules and the determining whether or not the dataset is excluded, the OSP 198 may use the dataset to produce the resource and includes the produced resource in the response.

In some embodiments, determining whether or not the dataset is excluded includes identifying a previously received dataset indicating a previous relationship instance involving the primary entity and the secondary entity, determining whether or not the previous relationship instance occurred within a predetermined time period, and determining that the dataset is not thus excluded based on whether or not the previous relationship instance occurred within the predetermined time period.

In some embodiments, determining whether or not the dataset is excluded includes obtaining a list of one or more distinguished secondary entities, determining whether or not the secondary entity is included in the list, and in which it is determined that the dataset is not excluded based on whether or not the secondary entity is determined to be in the list. The dataset may be excluded if secondary entity is in the list. The dataset may be excluded if the secondary entity is not in the list. The dataset may not be excluded unless the secondary entity is in the list. The OSP 198 may receive an indication that another secondary entity should be added to the list, and may add the secondary entity to the list. The OSP 198 may receive an indication that the other secondary entity should be removed from the list and remove the other secondary entity from the list. The OSP 198 may receive an indication that the other secondary entity should be removed from the list after a predetermined period of time and remove the other secondary entity from the list after the predetermined period of time has elapsed.

In some embodiments, determining whether or not the dataset is excluded includes applying sequentially the looked-up permission digital rules to the secondary entity until determining, based on the application, that the dataset is excluded and halting the application of the looked-up permission digital rules upon so determining.

In some embodiments, determining whether or not the dataset is excluded includes obtaining a safe list of one or more safe secondary entities deemed safe and that are not to be excluded, determining whether or not the secondary entity is included in the safe list, and determining by default that the dataset is excluded unless the secondary entity is determined to be included in the safe list.

In some embodiments, including an indication of the exclusion in the response includes parsing the dataset to obtain a base value of the dataset. The response may include the base value of the dataset. The response may include a negative of the base value of the dataset.

Figure 3:
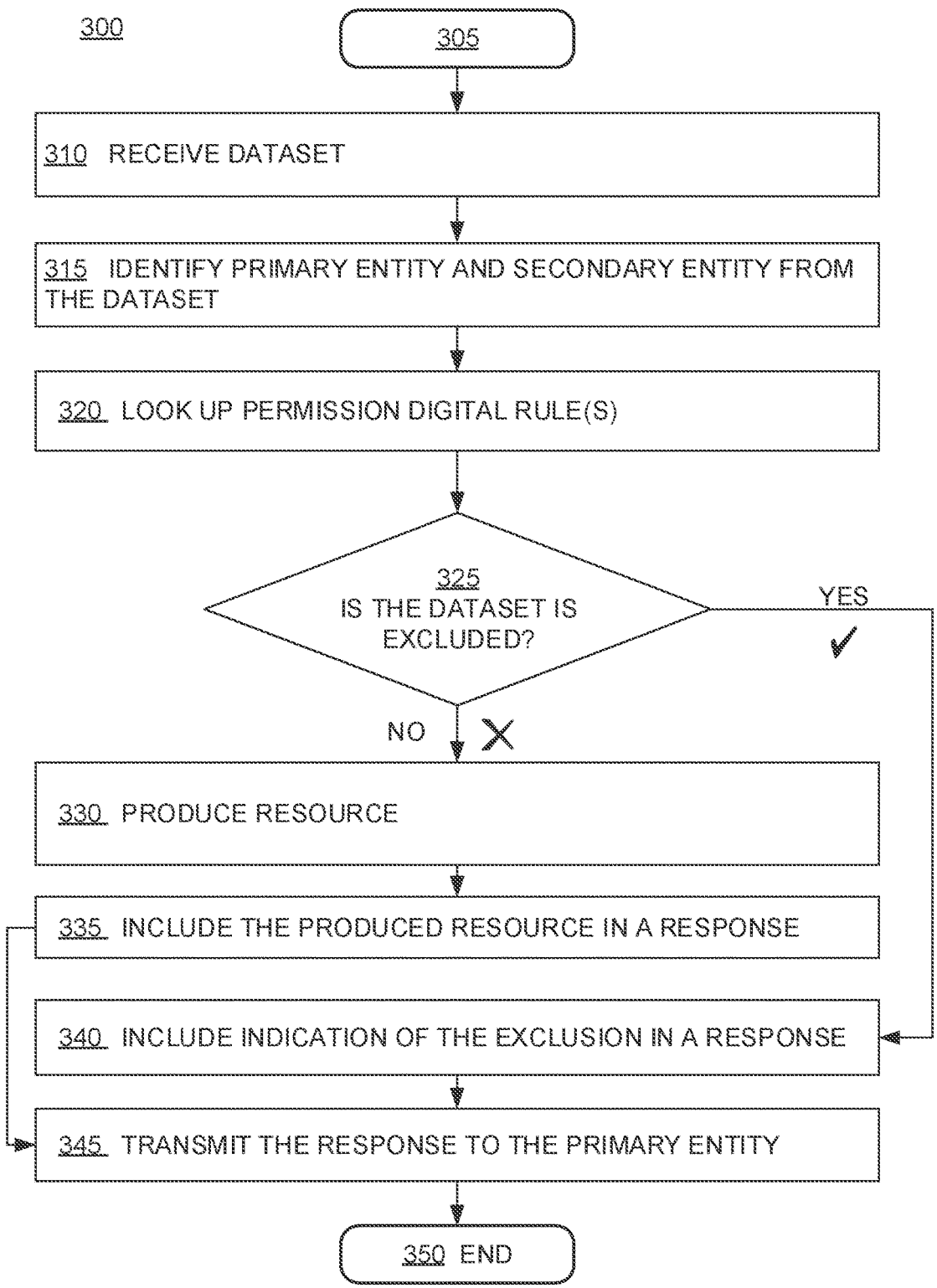
FIG. 3 is a flowchart for illustrating a sample method for determining whether or not a dataset is excluded that is an improvement in automated computerized systems, according to embodiments of the present disclosure.

FIG. 3 is a flowchart for illustrating a sample method 300 for determining whether or not a dataset is excluded that is an improvement in automated computerized systems, according to embodiments of the present disclosure.

Figure 4:
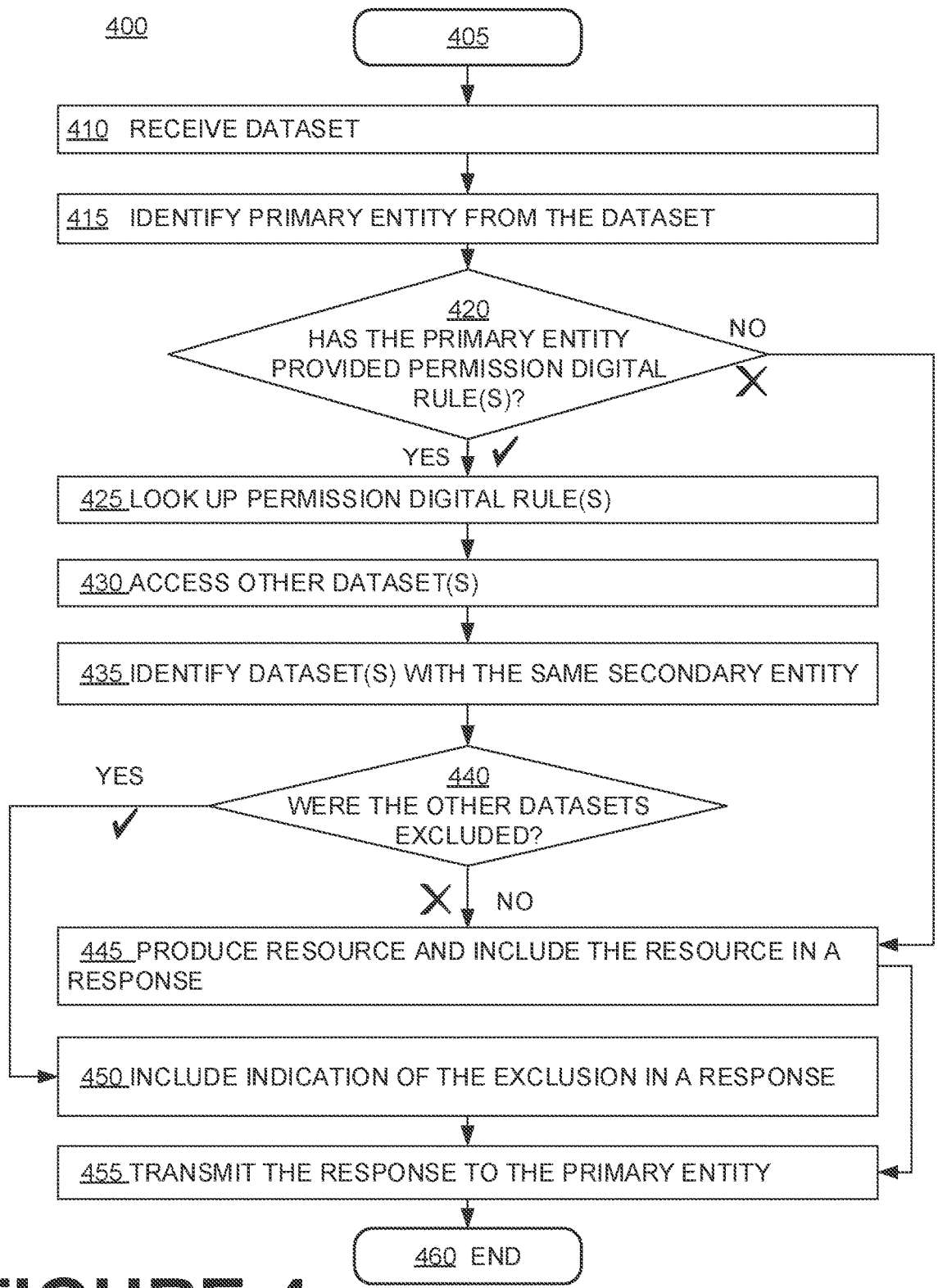
FIG. 4 is a flowchart for illustrating a sample method for determining whether or not a dataset is excluded based on whether a primary entity has provided permission digital rules that is an improvement in automated computerized systems, according to embodiments of the present disclosure.
Figure 5:
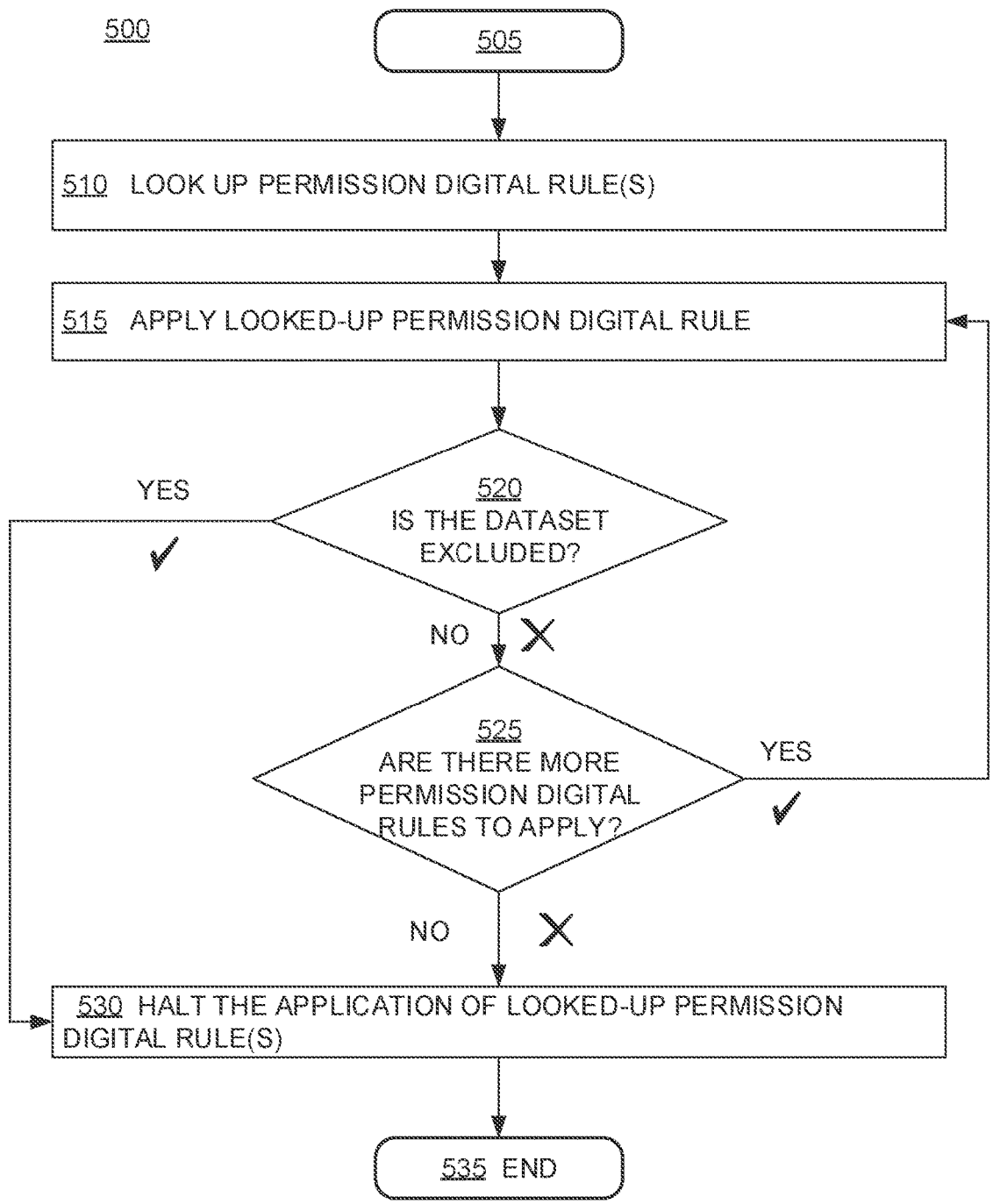
FIG. 5 is a flowchart for illustrating a sample method for applying permission digital rules to determine whether a dataset is excluded that is an improvement in automated computerized systems, according to embodiments of the present disclosure.

Although, in the present example, the operations and methods described with reference to the flowcharts illustrated in FIGS. 3-5 are described as being performed by the OSP 198, in various embodiments, one or more of the operations and methods described with reference to the flowcharts illustrated in FIGS. 6-8 may be performed by the client computer system 190.

The method 300 starts at 305.

At 310, the OSP 198 receives a dataset from a primary entity 193 indicating a proposed relationship instance between the primary entity 193 and a secondary entity 196.

At 315, the OSP 198 identifies the primary entity 193 and the secondary entity 196 from the dataset. Identification may be direct from the content of the dataset or indirect, for instance by looking up other sources using elements of the dataset.

At 320, the OSP 198 looks up permission digital rules 160 regarding the secondary entity 196. In some embodiments, the permission digital rules 160 may be obtained from the primary entity 193 for determining whether the dataset is excluded from being used to produce a resource 179 associated with the proposed relationship instance due to the secondary entity being a participant in the relationship instance. In other embodiments, the permission digital rules 160 may be stored within the OSP 198, or be looked up from elsewhere.

At 325, the OSP 198 determines whether or not the dataset 135 is excluded from being used to produce the resource 179. For making this determination, the OSP 198 applies the looked up PDRs 160 to the dataset 135 to determine whether the dataset is excluded.

If the dataset is excluded, the method proceeds to 340. At 340, the OSP 198 includes an indication of the exclusion in a notification 136, which is included in a response 137. The method then proceeds to 345.

If, at 325, the dataset is not excluded, the method proceeds to 330. At 330, the OSP 198 applies resource digital rules 170, that are different from the permission digital rules 160, to the dataset 135 to produce the resource 179.

At 335, the OSP 198 includes the produced resource 179 in a notification 136, which is included in a response 137. The method then proceeds to 345.

At 345, the response 137 is transmitted to the primary entity 193.

The method 300 ends at 350.

In some embodiments, determining whether the dataset is excluded includes checking whether or not the secondary entity is identified in a list of secondary entities regarding allowing or prohibiting the production of resources associated with relationship instances involving the secondary entities on the list. The OSP 198 may access other datasets that indicate other relationship instances for the secondary entity when the secondary entity is included on such a list. The OSP may identify at least one dataset of the other datasets that indicates the secondary entity was a participant in a relationship instance indicated by the identified dataset(s). The OSP may then check the identified dataset(s) based on parameters of the PDRs to determine whether the dataset 135 is excluded from being used to produce the resource.

In some embodiments, the OSP obtains an indication of the one or more PDRs from the primary entity 193.

In some embodiments, identifying the primary entity includes parsing the dataset. Identifying the primary entity may include determining a sender of the dataset.

In some embodiments, the OSP determines whether the primary entity 193 has provided any PDRs 160. The OSP may assume that the secondary entity is not excluded and use the dataset to produce the resource and include the resource in the response if the primary entity 193 has not provided any PDRs instead of looking up and applying any PDRs 160.

In some embodiments, as part of determining whether the dataset is excluded, the OSP identifies a previously received dataset indicating a previous relationship instance involving the primary entity and the secondary entity. The OSP may determine whether the previous relationship instance occurred within a predetermined time period. The dataset may not be excluded if the previous relationship instance occurred within the predetermined time period.

In some embodiments, determining whether the dataset is excluded includes obtaining a list of one or more distinguished secondary entities. The OSP may determine if the secondary entity is on the list and base the determination of whether to exclude the dataset on whether or not the secondary entity is on the list. The dataset may be excluded if the secondary entity is on the list. The dataset may be excluded if the secondary entity is not on the list. The dataset may not be excluded by default unless the secondary entity is on the list.

In some embodiments, the OSP may receive an indication that another secondary entity should be added to a list of distinguished secondary entities, and then add the other secondary entity to the list responsive to the received indication that that the other secondary entity should be added to the list. The OSP may receive an indication that the other secondary entity should be removed from the list, and then remove the secondary entity from the list responsive to the received indication that that the other secondary entity should be removed from the list. The OSP may receive an indication that the other secondary entity should be removed from the list after a predetermined period of time has elapsed, and then remove the other secondary entity from the list after the predetermined period of time elapses.

In some embodiments, determining whether the dataset is excluded includes obtaining a safe list of one or more secondary entities deemed safe and which are not to be excluded. The OSP may determine whether the secondary entity is included in the safe list and then determine by default that the dataset is excluded unless the secondary entity is in the safe list.

In some embodiments, the OSP parses the dataset to obtain the base value of the dataset. The OSP may include the base value of the dataset in the response when indicating that the dataset is excluded or included. The OSP may include the negative of the base value of the dataset in the response when indicating that the dataset is excluded or included. The OSP may include an attribute other than the base value of the dataset in the response when indicating the dataset is excluded or included.

In some embodiments, the OSP determines a type of relationship instance for the proposed relationship instance. The type of relationship instance may be included in the dataset. The OSP may obtain a list of approved primary entities which are approved for the type of relationship instance. The OSP may identify an additional dataset indicating an additional relationship instance involving the secondary entity and a different primary entity. The OSP may determine whether the different primary entity is included within the list of approved primary entities. The OSP may determine the dataset is not excluded from being used to produce a resource based on a determination that the different primary entity is within the list of approved primary entities. The OSP may receive an indication that an additional primary entity should be added to the list of approved primary entities, and add that additional primary entity to the list. The OSP may receive an indication that an additional primary entity should be added to the list of approved primary entities for a predetermined period of time, and add that additional primary entity to the list, then remove the additional primary entity from the list after the predetermined period of time elapses. The OSP may receive an indication that an additional different primary entity should be removed from the list, and remove the additional primary entity from the list.

FIG. 4 is a flowchart for illustrating a sample method 400 for determining whether or not a dataset is excluded based on whether a primary entity has provided permission digital rules that is an improvement in automated computerized systems, according to embodiments of the present disclosure.

The method 400 starts at 405.

At 410, the OSP 198 receives a dataset from a primary entity 193 indicating a proposed relationship instance between the primary entity 193 and a secondary entity 196.

At 415, the OSP 198 identifies the primary entity 193 and the secondary entity 196 from the dataset.

At 420, the OSP 198 determines whether any PDRs 160 were provided by the primary entity 193.

If the primary entity has not provided any PDRs 160, the method continues to 445. At 445, the OSP 198 applies resource digital rules 170 to the dataset 135 to produce the resource 179 and includes the resource in a response 137. The method then continues to 455.

If the primary entity has provided PDRs 160, the method continues to 425. At 425, the OSP 198 looks up PDRs 160 for determining whether the dataset is excluded from being used to produce a resource 179 associated with the proposed relationship instance due to the secondary entity being a participant in the relationship instance.

At 430, the OSP 198 accesses other datasets which occurred within a predetermined time period.

At 435, the OSP 198 identifies which of the other datasets involves the secondary entity.

At 440, the OSP 198 determines whether any of the other datasets which involve the secondary entity were excluded.

If at least one of the other datasets which involve the secondary entity were excluded, the method proceeds to 450, otherwise, the method proceeds to 445. At 450 the OSP 198 includes an indication of the exclusion of the dataset in a response. At 455 the OSP 198 transmits the response to the primary entity.

The method 400 ends at 460.

FIG. 5 is a flowchart for illustrating a sample method 500 for applying permission digital rules to determine whether a dataset is excluded that is an improvement in automated computerized systems, according to embodiments of the present disclosure.

The method 500 starts at 505.

At 510, the OSP 198 looks up PDRs 160 for determining whether the dataset is excluded from being used to produce a resource 179 associated with the proposed relationship instance due to the secondary entity being a participant in the relationship instance.

At 515, the OSP 198 applies one of the looked up PDRs 160 which has not yet been applied to the dataset 135 to determine whether the dataset is excluded.

At 520, if the dataset is excluded the method continues to 530, otherwise the method continues to 525.

At 525, if there are more looked up PDRs 160 to apply to the dataset the method continues to 515, otherwise the method continues to 530.

At 530, the application of digital rules is halted.

The method 500 ends at 535.

Figure 6:
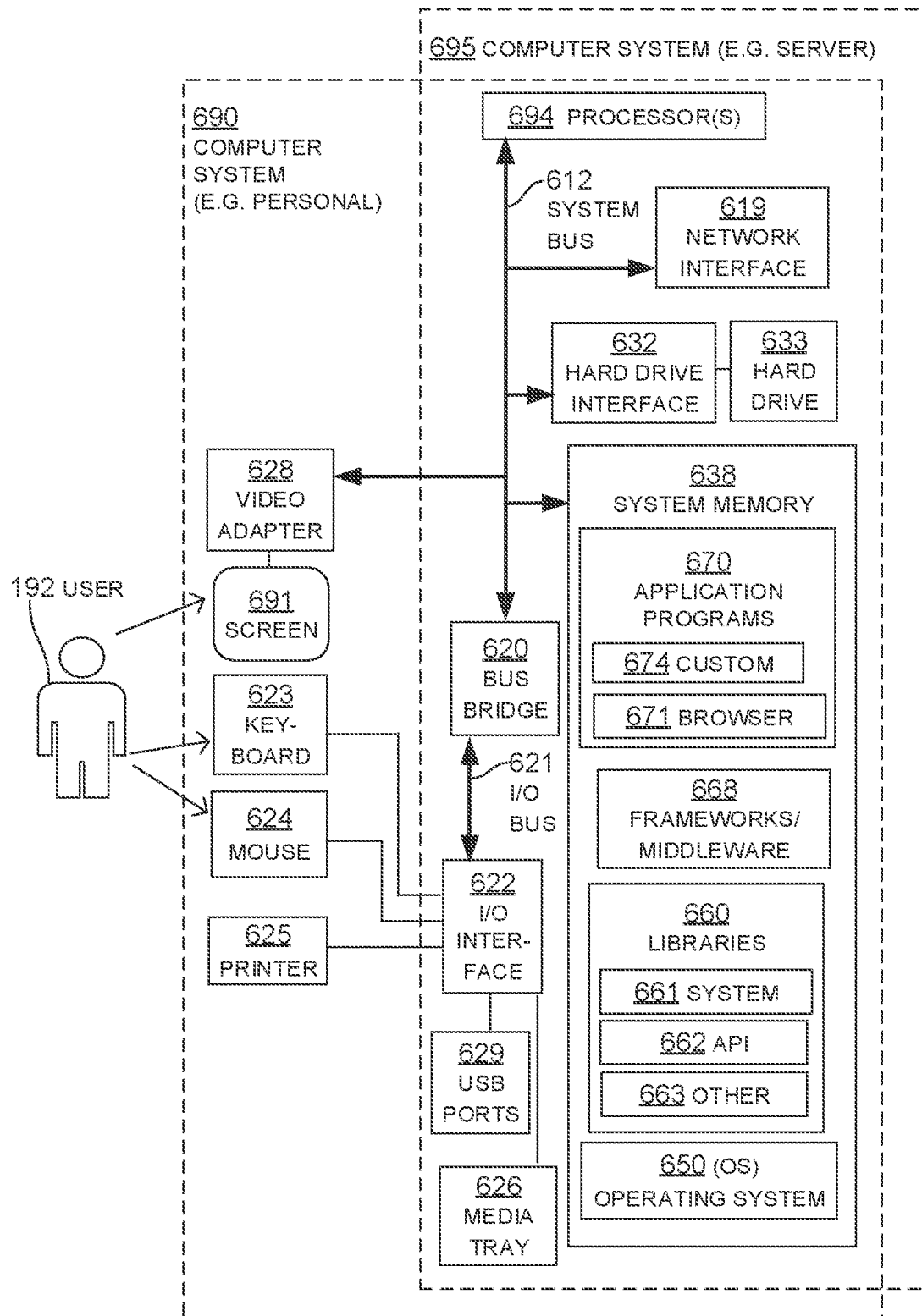
FIG. 6 is a block diagram showing additional components of sample computer systems according to embodiments.

FIG. 6 shows details for a sample computer system 695 and for a sample computer system 690. The computer system 695 may be a server, while the computer system 690 may be a personal device, such as a personal computer, a desktop computer, a personal computing device such as a laptop computer, a tablet computer, a mobile phone, and so on. Either type may be used for the computer system 195 and 190 of FIG. 1B, and/or a computer system that is part of OPF 189.

The computer system 695 and the computer system 690 have similarities, which FIG. 6 exploits for purposes of economy in this document. It will be understood, however, that a component in the computer system 695 may be implemented differently than the same component in the computer system 690. For instance, a memory in a server may be larger than a memory in a personal computer, and so on. Similarly, custom application programs 674 that implement embodiments may be different, and so on.

The computer system 695 includes one or more processors 694. The processor(s) 694 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 694 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores."

A hardware component such as a processor may also include programmable logic or circuitry that is temporarily configured by software to perform certain operations. For example, a hardware component may include software executed by a general-purpose processor or another type of programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 695, or the computer system 690, are not intended to be exhaustive. Rather, they are representative, for highlighting essential components that can be used with embodiments.

The computer system 695 also includes a system bus 612 that is coupled to the processor(s) 694. The system bus 612 can be used by the processor(s) 694 to control and/or communicate with other components of the computer system 695.

The computer system 695 additionally includes a network interface 619 that is coupled to system bus 612. Network interface 619 can be used to access a communications network, such as the network 188. Network interface 619 can be implemented by a hardware network interface, such as a Network Interface Card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on.

The computer system 695 also includes various memory components. These memory components include memory components shown separately in the computer system 695, plus cache memory within the processor(s) 694. Accordingly, these memory components are examples of non-transitory machine-readable media. The memory components shown separately in the computer system 695 are variously coupled, directly or indirectly, with the processor(s) 694. The coupling in this example is via the system bus 612.

Instructions for performing any of the methods or functions described in this document may be stored, completely or partially, within the memory components of the computer system 695, etc. Therefore, one or more of these non-transitory computer-readable media can be configured to store instructions which, when executed by one or more processors 694 of a host computer system such as the computer system 695 or the computer system 690, can cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 695 include a non-volatile hard drive 633. The computer system 695 further includes a hard drive interface 632 that is coupled to the hard drive 633 and to the system bus 612.

The memory components of the computer system 695 include a system memory 638. The system memory 638 includes volatile memory including, but not limited to, cache memory, registers and buffers. In embodiments, data from the hard drive 633 populates registers of the volatile memory of the system memory 638.

In some embodiments, the system memory 638 has a software architecture that uses a stack of layers, with each layer providing a particular functionality. In this example the layers include, starting from the bottom, an Operating System (OS) 650, libraries 660, frameworks/middleware 668 and application programs 670, which are also known as applications 670. Other software architectures may include less, more or different layers. For example, a presentation layer may also be included. For another example, some mobile or special purpose operating systems may not provide a frameworks/middleware 668.

The OS 650 may manage hardware resources and provide common services. The libraries 660 provide a common infrastructure that is used by the applications 670 and/or other components and/or layers. The libraries 660 provide functionality that allows other software components to perform tasks more easily than if they interfaced directly with the specific underlying functionality of the OS 650. The libraries 660 may include system libraries 661, such as a C standard library. The system libraries 661 may provide functions such as memory allocation functions, string manipulation functions, mathematical functions, and the like.

In addition, the libraries 660 may include API libraries 662 and other libraries 663. The API libraries 662 may include media libraries, such as libraries to support presentation and manipulation of various media formats such as MPREG4, H.264, MP3, AAC, AMR, JPG, and PNG. The API libraries 662 may also include graphics libraries, for instance an OpenGL framework that may be used to render 2D and 3D in a graphic content on the screen 691. The API libraries 662 may further include database libraries, for instance SQLite, which may support various relational database functions. The API libraries 662 may additionally include web libraries, for instance WebKit, which may support web browsing functionality, and also libraries for applications 670.

The frameworks/middleware 668 may provide a higher-level common infrastructure that may be used by the applications 670 and/or other software components/modules. For example, the frameworks/middleware 668 may provide various Graphic User Interface (GUI) functions, high-level resource management, high-level location services, and so forth. The frameworks/middleware 668 may provide a broad spectrum of other APIs that may be used by the applications 670 and/or other software components/modules, some of which may be specific to the OS 650 or to a platform.

The application programs 670 are also known more simply as applications and apps. One such app is a browser 671, which is a software that can permit the user 192 to access other devices in the internet, for example while using a Graphic User Interface (GUI). The browser 671 includes program modules and instructions that enable the computer system 695 to exchange network messages with a network, for example using Hypertext Transfer Protocol (HTTP) messaging.

The application programs 670 may include one or more custom applications 674, made according to embodiments. These can be made so as to cause their host computer to perform operations according to embodiments. Of course, when implemented by software, operations according to embodiments may be implemented much faster than may be implemented by a human mind; for example, tens or hundreds of such operations may be performed per second according to embodiments, which is much faster than a human mind can do.

Other such applications 670 may include a contacts application, a book reader application, a location application, a media application, a messaging application, and so on. Applications 670 may be developed using the ANDROID™ or iOS™ Software Development Kit (SDK) by an entity other than the vendor of the particular platform, and may be mobile software running on a mobile operating system such as iOS™, ANDROID™, WINDOWS® Phone, or other mobile operating systems. The applications 670 may use built-in functions of the OS 650, of the libraries 660, and of the frameworks/middleware 668 to create user interfaces for the user 192 to interact with.

The computer system 695 moreover includes a bus bridge 620 coupled to the system bus 612. The computer system 695 furthermore includes an input/output (I/O) bus 621 coupled to the bus bridge 620. The computer system 695 also includes an I/O interface 622 coupled to the I/O bus 621.

For being accessed, the computer system 695 also includes one or more Universal Serial Bus (USB) ports 629. These can be coupled to the I/O interface 622. The computer system 695 further includes a media tray 626, which may include storage devices such as CD-ROM drives, multimedia interfaces, and so on.

The computer system 690 may include many components similar to those of the computer system 695, as seen in FIG. 6. In addition, a number of the application programs may be more suitable for the computer system 690 than for the computer system 695.

The computer system 690 further includes peripheral input/output (I/O) devices for being accessed by a user more routinely. As such, the computer system 690 includes a screen 691 and a video adapter 628 to drive and/or support the screen 691. The video adapter 628 is coupled to the system bus 612.

The computer system 690 also includes a keyboard 623, a mouse 624, and a printer 625. In this example, the keyboard 623, the mouse 624, and the printer 625 are directly coupled to the I/O interface 622. Sometimes this coupling is via the USB ports 629.

In this context, "machine-readable medium" refers to a component, device or other tangible media able to store instructions and data temporarily or permanently and may include, but is not limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing. The machine that would read such a medium includes one or more processors 694.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general, non-programmed machine into a particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Operational Examples—Use Cases

The above-mentioned embodiments have one or more uses. Aspects presented below may be implemented as was described above for similar aspects. (Some, but not all of these aspects have even similar reference numerals.)

Operational examples and sample use cases are possible where the attribute of an entity in a dataset is any one of the entity's name, type of entity, a physical location such as an address, a contact information element, an affiliation, a characterization of another entity, a characterization by another entity, an association or relationship with another entity (general or specific instances), an asset of the entity, a declaration by or on behalf of the entity, and so on. Different resources may be produced in such instances, and so on.

Referring again to FIGS. 1-5, as an example use case, businesses, such as client 193, may use the OSP 198 to estimate a resource (e.g., a sales tax, service tax, use tax, electronic waste recycling (eWaste) fees, etc.) on transactions with customers, such as with secondary entity 196. Such estimations may be made and transmitted before, during and/or after these transactions. Such taxes involving transactions may be referred to herein generally as transaction taxes. Such transactions with customers are examples of relationship instances with secondary entities, such as secondary entity 196, described above. The businesses may transmit information to the OSP 198 over network 188 via connector 122 in order to enable the OSP 198 to produce and transmit the tax estimates back to the businesses. This information may include, but is not limited to: data regarding the seller and recipient of the goods or services involved in the transaction; the respective locations of the seller, the recipient, and the goods and/or services; locations where the goods are delivered or where the recipient takes possession of the goods or receives the services; data about the goods and/or services being sold; and other transaction data. This data may be included in a dataset, such as dataset 135 shown in FIG. 1B.

However, due to certain obligations, requirements, etc., a primary entity 193 may be unable to, or unwilling to, perform transactions with a secondary entity 196. This may be because of a multitude of reasons such as: a primary entity wanting verification that a secondary entity has obtained legitimate goods in the past; the primary entity has established, or is required to follow, certain conditions or attributes of the secondary entity to enter into transactions with the secondary entity; the secondary entity has entered into transactions with other reputable entities; etc. As a result of these obligations and in order to ensure a resource is produced only if the transaction is allowed, an OSP 198 can apply PDRs 160 to a dataset 135 in order to determine whether or not the primary entity 193 and secondary entity 196 can enter the transaction together. Additionally, the OSP 198 is able to provide additional functionality and scope of PDRs 160 because it can: access transactions involving the secondary entity 196 and other primary entities similar to the primary entity 193; access previous transactions between the primary entity 193 and secondary entity 196; access safe lists or exclusion lists of other primary entities; etc. This allows the OSP 198 to apply the PDRs 160 in a more efficient manner than the primary entity 193 itself, because the OSP 198 has easy access to data which the primary entity would have to be specially configured to obtain.

Figure 7:
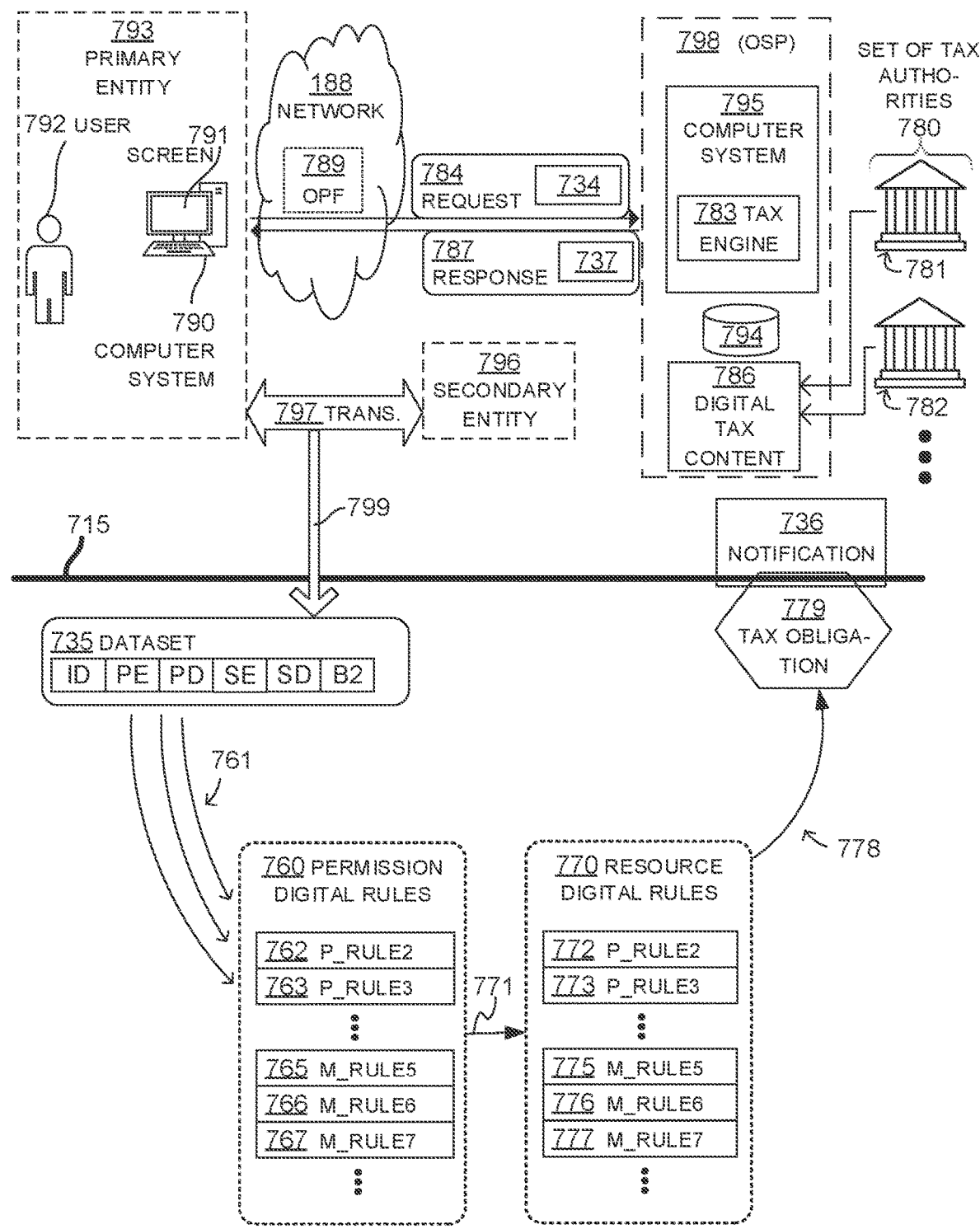
FIG. 7 is a diagram of sample aspects for describing operational examples and use cases of embodiments.

FIG. 7 is a diagram for an operational example and use case where the resource is a tax obligation 779 of a primary entity 793 and/or a secondary entity 796, due to a transaction 797. The transaction 797 is an example of a relationship instance between the primary entity 793 and the secondary entity 796.

It will be recognized that aspects of FIG. 7 have similarities with aspects of FIG. 1B. Portions of such aspects may be implemented as described for analogous aspects of FIG. 1B. In particular, a thick line 715 separates FIG. 7, although not completely or rigorously, into a top portion and a bottom portion. Above the line 715 the emphasis is mostly on entities, components, their relationships, and their interactions, while below it the emphasis is mostly processing of data that takes place often within one or more of the components above the line 715.

Above the line 715, a computer system 795 is shown, which is used to help customers, such as a user 792, with tax compliance. Further in this example, the computer system 795 is part of an OSP 798 that is implemented as a Software as a Service (SaaS) provider, for being accessed by the user 792 online. Alternately, the functionality of the computer system 795 may be provided locally to a user.

The user 792 may be standalone. The user 792 may use a computer system 790 that has a screen 791. In embodiments, the user 792 and the computer system 790 are considered part of the primary entity 793, which is also known as entity 793. The primary entity 793 can be a business, such as a seller of items, a reseller, a buyer, and so on. In such instances, the user 792 can be an employee, a contractor, or otherwise an agent of the entity 793. In use cases the entity 793 is a seller, the secondary entity 796 is a buyer, and together they are performing the buy-sell transaction 797. The buy-sell transaction 797 may involve an operation, such as an exchange of data to form an agreement. This operation can be performed in person, or over the network 188, etc. In such cases the entity 793 can even be an online seller, but that is not necessary. The transaction 797 will have data that is known to the entity 793, similarly with what was described by the relationship instance 197 of FIG. 1B.

In a number of instances, the user 792 and/or the entity 793 use software applications to manage their business activities, such as sales, resource management, production, inventory management, delivery, billing, and so on. The user 792 and/or the entity 793 may further use accounting applications to manage purchase orders, sales invoices, refunds, payroll, accounts payable, accounts receivable, and so on. Such software applications, and more, may be used locally by the user 792, or from an Online Processing Facility (OPF) 789 that has been engaged for this purpose by the user 792 and/or the entity 793. In such use cases, the OPF 789 can be a Mobile Payments system, a Point of Sale (POS) system, an Accounting application, an Enterprise Resource Planning (ERP) provider, an e-commerce provider, an electronic marketplace, a Customer Relationship Management (CRM) system, and so on.

Businesses have tax obligations to various tax authorities of respective tax jurisdictions. A first challenge is in making the related determinations. Tax-related determinations, made for the ultimate purpose of tax compliance, are challenging because the underlying statutes and tax rules and guidance issued by the tax authorities are very complex. There are various types of tax, such as sales tax, use tax, excise tax, value-added tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority offers a temporary tax holiday, during which certain taxes are waived.

Tax jurisdictions are defined mainly by geography. Businesses have tax obligations to various tax authorities within the respective tax jurisdictions. There are various tax authorities, such as that of a group of countries, of a single country, of a state, of a county, of a municipality, of a city, of a local district such as a local transit district and so on. So, for example, when a business sells items in transactions that can be taxed by a tax authority, the business may have the tax obligations to the tax authority. These obligations include requiring the business to: a) register itself with the tax authority's taxing agency, b) set up internal processes for collecting sales tax in accordance with the sales tax rules of the tax authority, c) maintain records of the sales transactions and of the collected sales tax in the event of a subsequent audit by the taxing agency, d) periodically prepare a form ("tax return") that includes an accurate determination of the amount of the money owed to the tax authority as sales tax because of the sales transactions, e) file the tax return with the tax authority by a deadline determined by the tax authority, and f) pay ("remit") that amount of money to the tax authority. In such cases, the filing and payment frequency and deadlines are determined by the tax authority.

A challenge for businesses is that the above-mentioned software applications generally cannot provide tax information that is accurate enough for the businesses to be tax compliant with all the relevant tax authorities. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities-if they cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority audits the seller. Then the seller will be required to pay the difference, plus fines and/or late fees, because ignorance of the law is not an excuse. Further, one should note that sales taxes are considered trust-fund taxes, meaning that the management of a company can be held personally liable for the unpaid sales tax.

For sales in particular, making correct determinations for sales and use tax is even more difficult. There are a number of factors that contribute to its complexity.

First, some state and local tax authorities have origin-based tax rules, while others have destination-based tax rules. Accordingly, a sales tax may be charged from the seller's location or from the buyer's location.

Second, the various tax authorities assess different, i.e., non-uniform, percentage rates of the sales price as sales tax, for the purchase and sale of items that involve their various tax jurisdictions. These tax jurisdictions include various states, counties, cities, municipalities, special taxing jurisdictions, and so on. In fact, there are over 10,000 different tax jurisdictions in the United States, with many partially overlapping.

Third, in some instances no sales tax is due at all because of the type of item sold. For example, in 2018 selling cowboy boots was exempt from sales tax in Texas, but not in New York. This non-uniformity gives rise to numerous individual taxability rules related to various products and services across different tax jurisdictions.

Fourth, in some instances no sales tax is due at all because of who the individual buyer is. For example, certain entities are exempt from paying sales tax on their purchases, so long as they properly create and sign an exemption certificate and give it to the seller for each purchase made. Entities that are entitled to such exemptions may include wholesalers, resellers, non-profit charities, educational institutions, etc. Of course, who can be exempt is not exactly the same in each tax jurisdiction. And, even when an entity is entitled to be exempt, different tax jurisdictions may have different requirements for the certificate of exemption to be issued and/or remain valid.

Fifth, it can be hard to determine which tax authorities a seller owes sales tax to. A seller may start with tax jurisdictions that it has a physical presence in, such as a main office, a distribution center or warehouse, an employee working remotely, and so on. Such ties with a tax jurisdiction establish the so-called physical nexus. However, a tax authority such as a state or even a city may set its own nexus rules for when a business is considered to be "engaged in business" with it, and therefore that business is subject to registration and collection of sales taxes. These nexus rules may include different types of nexus, such as affiliate nexus, click-through nexus, cookie nexus, economic nexus with thresholds, and so on. For instance, due to economic nexus, a remote seller may owe sales tax for sales made in the jurisdiction that are a) above a set threshold volume, and/or b) above a set threshold number of sales transactions.

Lastly, even where a seller might not have reached any of the thresholds for economic nexus, a number of states are promulgating marketplace facilitator laws that sometimes use such thresholds. According to such laws, intermediaries that are characterized as marketplace facilitators per laws of the state have an obligation, instead of the seller, to collect sales tax on behalf of their sellers, and remit it to the state. The situation becomes even more complex when a seller sells directly to a state, and also via such an intermediary.

To help with such complex determinations, the computer system 795 may be specialized for tax compliance. The computer system 795 may have one or more processors and memory, for example as was described for the computer system 195 of FIG. 1B. The computer system 795 thus implements a tax engine 783 to make the determinations of tax obligations. The tax engine 783 can be as described for the service engine 183.

The computer system 795 may further store locally entity data, i.e., data of user 792 and/or of entity 793, either of which/whom may be a customer, and/or a seller or a buyer in a sales transaction. The entity data may include profile data of the customer, and transaction data from which a determination of a tax obligation is desired. In the online implementation of FIG. 7, the OSP 798 has a database 794 for storing the entity data. This entity data may be inputted by the user 792, and/or caused to be downloaded or uploading by the user 792 from the computer system 790 or from the OPF 789, or extracted from the computer system 790 or from OPF 789, and so on. In other implementations, a simpler memory configuration may suffice for storing the entity data.

A digital tax content 786 is further implemented within the OSP 798. The digital tax content 786 can be a utility that stores resource digital rules 770 for use by the tax engine 783. As part of managing the digital tax content 786, there may be continuous updates of the resource digital rules, by inputs gleaned from a set 780 of different tax authorities 781, 782 . . . . Updating may be performed by humans, or by computers, and so on. As mentioned above, the number of the different tax authorities in the set 780 may be very large.

For a specific determination of a tax obligation, the computer system 795 may receive one or more datasets. A sample received dataset 735 is shown just below line 715, which can be similar to what was described for the dataset 135 of FIG. 1B. In this example, the computer system 790 transmits a request 784 that includes a payload 734, and the dataset 735 is received by the computer system 795 parsing the received payload 734. In this example the single payload 734 encodes the entire dataset 735, but that is not required, as mentioned earlier.

In this example, the dataset 735 has been received because it is desired to determine any tax obligations arising from the buy-sell transaction 797. As such, the sample received dataset 735 has values that characterize attributes of the buy-sell transaction 797, as indicated by an arrow 799. (It should be noted that the arrow 799 describes a correspondence, but not the journey of the data of the buy-sell transaction 797 in becoming the received dataset 735.) Accordingly, in this example the sample received dataset 735 has a value ID for an identity of the dataset 735 and/or the transaction 797. The dataset 735 also has a value PE for the name of the primary entity 793 or the user 792, which can be the seller making sales transactions, some online. The dataset 735 further has a value PD for relevant data of the primary entity 793 or the user 792, such as an address, place(s) of business, prior nexus determinations with various tax jurisdictions, and so on. The dataset 735 also has a value SE for the name of the secondary entity 796, which can be the buyer. The dataset 735 further has a value SD for relevant data of the secondary entity 796, entity-driven exemption status, and so on. The dataset 735 has a value B2 for the sale price of the item sold. The dataset 735 may further have additional values, as indicated by the dot-dot-dot in the dataset 735. These values may characterize further attributes, such as what item was sold, for example by a Stock Keeping Unit (SKU), how many units of the item were sold, a date and possibly also time of the transaction 797, and so on.

The permission digital rules 760 have been created to accommodate PDRs which are used to determine whether or not a resource should be produced for a dataset based on the secondary entity identified by the dataset. In various embodiments, the PDRs that make up the permission digital rules 760 are obtained from a primary entity 193. In FIG. 7 five sample permission digital rules are shown, namely P_RULE2 762, P_RULE3 763, M_RULE5 765, M_RULE6 766 and M_RULE7 767. Additional permission digital rules 760 are suggested by the vertical dot-dot-dots. Similarly with FIG. 1B, some of these permission digital rules may be permission digital main rules that determine whether or not a dataset 135, or a secondary entity 196, is excluded or is permitted, while others can be permission digital precedence rules that determine which of the permission digital main rules is to be applied in the event of conflict. In some use cases, permission digital main rules may be about a safe list or exclusion list for secondary entities or primary entities, the outcome of previous transactions involving a secondary entity or primary entity, etc. Permission digital precedence rules may be permission digital rules that determine whether permission digital main rules are to be applied for certain secondary entities or primary entities.

Similarly with FIG. 1B, these permission digital rules 760 can be implemented or organized in different ways. In some use cases they can be organized with conditions and consequents, such as was described earlier in this document. Such conditions may relate to previous transactions involving a secondary entity or primary entity, rules defined by primary entities, lists generated by primary entities, etc. These conditions may be expressed as logical conditions with ranges, dates, other data, and so on. Values of the dataset 735 can be iteratively tested against these logical conditions according to arrows 761.

The resource digital rules 770 have been created so as to accommodate tax rules that the set 780 of different tax authorities 781, 782 . . . promulgate within the boundaries of their tax jurisdictions. In FIG. 7 five sample resource digital rules are shown, namely P_RULE2 772, P_RULE3 773, M_RULE5 775, M_RULE6 776 and M_RULE7 777. Additional resource digital rules 770 are suggested by the vertical dot-dot-dots. Similarly with FIG. 1B, some of these resource digital rules may be digital main rules that determine the tax obligation 779, while others can be resource digital precedence rules that determine which of the resource digital main rules is to be applied in the event of conflict. In some use cases, resource digital main rules may be about a sales tax or use tax being owed due to the transaction 797 at a certain percentage of the purchase price. Resource digital precedence rules may be resource digital rules that determine whether resource digital rules are to be applied for origin-based or destination-based jurisdictions, how to override for diverse taxability of individual items, for temporary tax holidays, for exemptions from having to pay sales tax based on who the buyer is, and also based on nexus, and so on.

Similarly with FIG. 1B, these resource digital rules 770 can be implemented or organized in different ways. In some use cases they can be organized with conditions and consequents, such as was described earlier in this document. Such conditions may relate to geographical boundaries, effective dates, and so on, for determining where and when a resource digital rule is to be applied. These conditions may be expressed as logical conditions with ranges, dates, other data, and so on. Values of the dataset 735 can be iteratively tested against these logical conditions according to arrow 771. In such cases, the consequents may indicate one or more tax obligations, such as to indicate different types of taxes that are due, rules, rates, exemption requirements, reporting requirements, remittance requirements, etc.

In this example, a certain permission digital rule M_RULE6 766 is shown as identified and used, which is indicated also by the beginning of an arrow 771. Identifying may be performed responsive to the values of the dataset 735, which are shown as considered for permission digital rules 760 by arrows 761. For example, it can be recognized that a condition of the permission digital rule M_RULE6 766 is met by one or more of the values of the dataset 735. For instance, it can be further determined that, at the time of the sale, the buyer 796 has previously transacted with, and been approved to work with, the seller 793.

In this example, a certain resource digital rule M_RULE6 776 is shown as identified and used, which is indicated also by the beginning of an arrow 778. Identifying may be performed responsive to the values of the dataset 735, which are shown as considered for resource digital rules 770 by arrows 761, and to the indication that the transaction is permitted by the permission digital rules 760. For example, it can be recognized that a condition of the resource digital rule M_RULE6 776 is met by one or more of the values of the dataset 735. For instance, it can be further determined that, at the time of the sale, the buyer 796 is located within the boundaries of a tax jurisdiction, that the seller 793 has nexus with that tax jurisdiction, and that there is no tax holiday.

As such, the computer system 795 may produce the tax obligation 779, which is akin to producing the resource 179 of FIG. 1B. The tax obligation 779 can be produced by the computer system 795 applying the certain resource digital rule M_RULE6 776, as indicated by the arrow 778. In this example, the consequent of the identified certain resource digital rule M_RULE6 776 may specify that a sales tax is due, the amount is to be determined by a multiplication of the sale price of the value B2 by a specific rate, the tax return form that needs to be prepared and filed, a date by which it needs to be filed, and so on.

The computer system 795 may then cause a notification 736 to be transmitted. The notification 736 can be about an aspect of the tax obligation 779, similarly with the notification 136 of FIG. 1B. In the example of FIG. 7, the notification 736 is caused to be transmitted by the computer system 795 as an answer to the received dataset 735. The notification 736 can be about an aspect of the tax obligation 779. In particular, the notification 736 may inform about the aspect of the tax obligation 779, namely that it has been determined, where it can be found, what it is, or at least a portion or a statistic of its content, and so on.

The notification 736 can be transmitted to one of an output device and another device that can be the remote device, from which the dataset 735 was received. The output device maybe the screen of a local user or a remote user. The notification 736 may thus cause a desired image to appear on the screen, such as within a Graphical User Interface (GUI) and so on. The other device may be a remote device, as in this example. In particular, the computer system 795 causes the notification 736 to be communicated by being encoded as a payload 737, which is carried by a response 787. The response 787 may be transmitted via the network 188 responsive to the received request 784. The response 787 may be transmitted to the computer system 790, or to OPF 789, and so on. As such, the other device can be the computer system 790, or a device of the OPF 789, or the screen 791 of the user 792, and so on. In this example the single payload 737 encodes the entire notification 736, but that is not required, similarly with what is written above about encoding datasets in payloads. Of course, along with the aspect of the tax obligation 779, it is advantageous to embed in the payload 737 the ID value and/or one or more values of the dataset 735. This will help the recipient correlate the response 787 to the request 784, and therefore match the received aspect of the tax obligation 779 as the answer to the received dataset 735.

FIGS. 8-13 display sample views of User Interfaces (UIs). Each of the UIs displayed in FIGS. 8-13 may be presented on the screen 191 of the computer system 190. The SDK 125 and connector 122 may be used to present the UIs, as well as to communicate any input received from the UIs to the OSP 198. The UIs may be used by the primary entity 193 to generate the permission digital rules 126.

Figure 8:
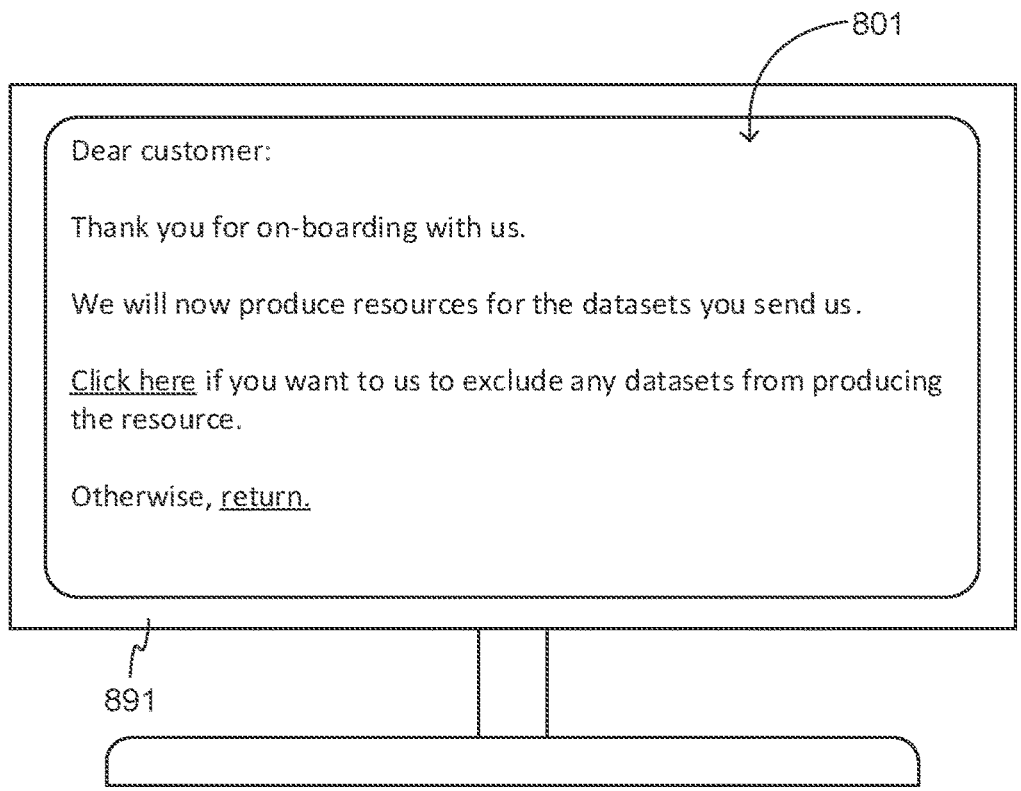
FIG. 8 is a sample view of a User Interface (UI) of a system for applying permission digital rules that provides an option to exclude datasets based on permission digital rules that is an improvement in automated computerized systems, according to embodiments of the present disclosure.

FIG. 8 is a sample view of a User Interface (UI) 801 of a system for applying permission digital rules that provides an option to exclude datasets based on permission digital rules that is an improvement in automated computerized systems, according to embodiments of the present disclosure.

A primary entity may choose to exclude datasets from being used to produce a resource based on the application of permission digital rules to a secondary entity identified in the dataset. The screen 891 displays the UI 801 which is used to provide an interface for a primary entity to choose to define permission digital rules. In particular, in the present example, a "Click Here" selectable user interface element is presented which the user may select to indicate that the primary entity chooses to exclude certain datasets from being used to produce a resource. Also presented in UI 801 is a "Return" selectable user interface element which the user may select to indicate that the primary entity chooses not to exclude certain datasets from being used to produce a resource.

Figure 9:
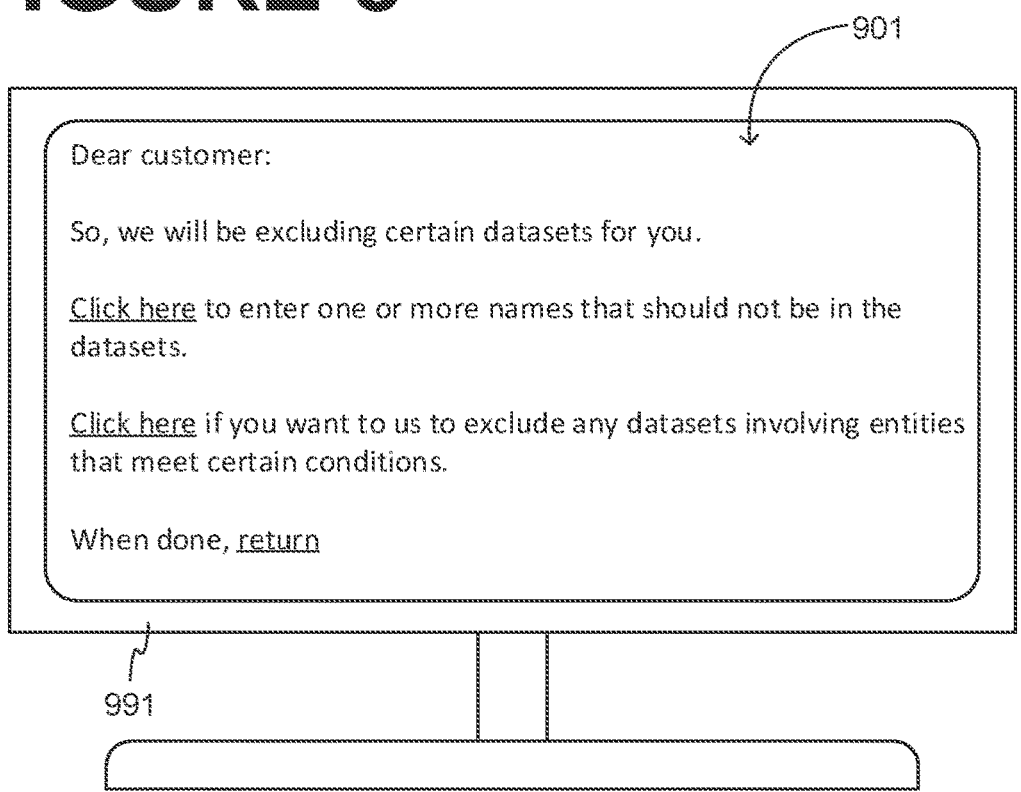
FIG. 9 is a sample view of a User Interface (UI) of a system for applying permission digital rules that provides an option to exclude particular entities or define permission digital rules that is an improvement in automated computerized systems, according to embodiments of the present disclosure.

FIG. 9 is a sample view of a User Interface (UI) 901 of a system for applying permission digital rules that provides an option to exclude particular entities or define permission digital rules that is an improvement in automated computerized systems, according to embodiments of the present disclosure.

A primary entity may use the UI 901 displayed by the screen 991 to define a list of secondary entities which should be excluded or to define conditions used to exclude secondary entities. In particular, in the present example, a "Click Here" selectable user interface element is presented which the user may select to enter names of secondary entities whose datasets should be excluded. Also presented in UI 901 is a "Click Here" selectable user interface element allowing a user to enter any conditions that should be used to exclude any datasets. Additionally presented in UI 901 is a "return" selectable user interface element which the user may select to indicate that the primary entity has finished building a list of names or conditions which are used to exclude datasets.

Figure 10:
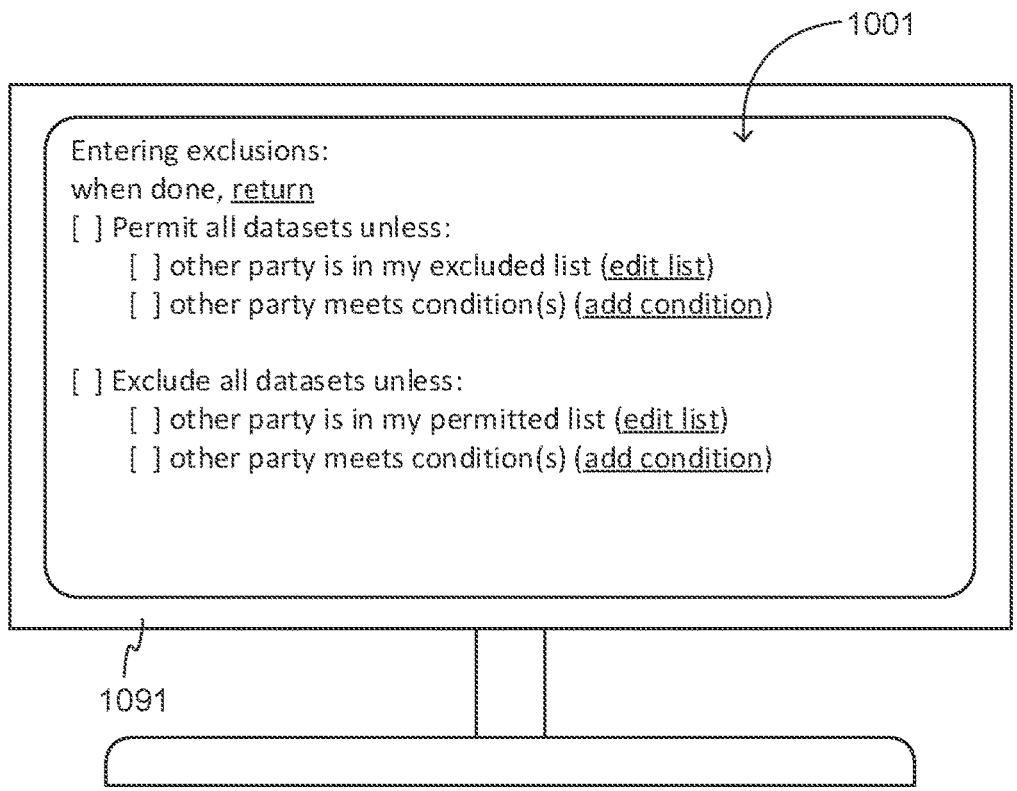
FIG. 10 is a sample view of a User Interface (UI) of a system for applying permission digital rules that provides an option to define permission digital rules based on a permission list, exclusion list, or one or more conditions that is an improvement in automated computerized systems, according to embodiments of the present disclosure.

FIG. 10 is a sample view of a User Interface (UI) 1001 of a system for applying permission digital rules based on a permission list, exclusion list, or one or more conditions that is an improvement in automated computerized systems, according to embodiments of the present disclosure.

A primary entity may use the UI 1001 displayed by the screen 1091 to define PDRs. For example, the UI 1001 allows a primary entity to choose to permit all datasets unless the secondary entity is in a predefined list, which the primary entity may choose to populate manually, when the secondary entity meets certain conditions, or both. Likewise, the UI 1001 allows a primary entity to choose to exclude all datasets unless the secondary entity is in a predefined list, which the primary entity may choose to populate manually, when the secondary entity meets certain conditions, or both. In particular, in the present example, selectable user interface elements for choosing to permit or exclude all datasets based on conditions are included in UI 1001. Additionally, presented in UI 1001, are "edit list" and "add condition" selectable user interface elements for a user to edit any list of secondary entities or add any conditions respectively, for excluding or permitting datasets. Also presented in UI 1001 is a "return" selectable user interface element which the user may select to indicate that the primary entity has finished adding or editing a list of names or conditions which are used to exclude datasets.

Figure 11:
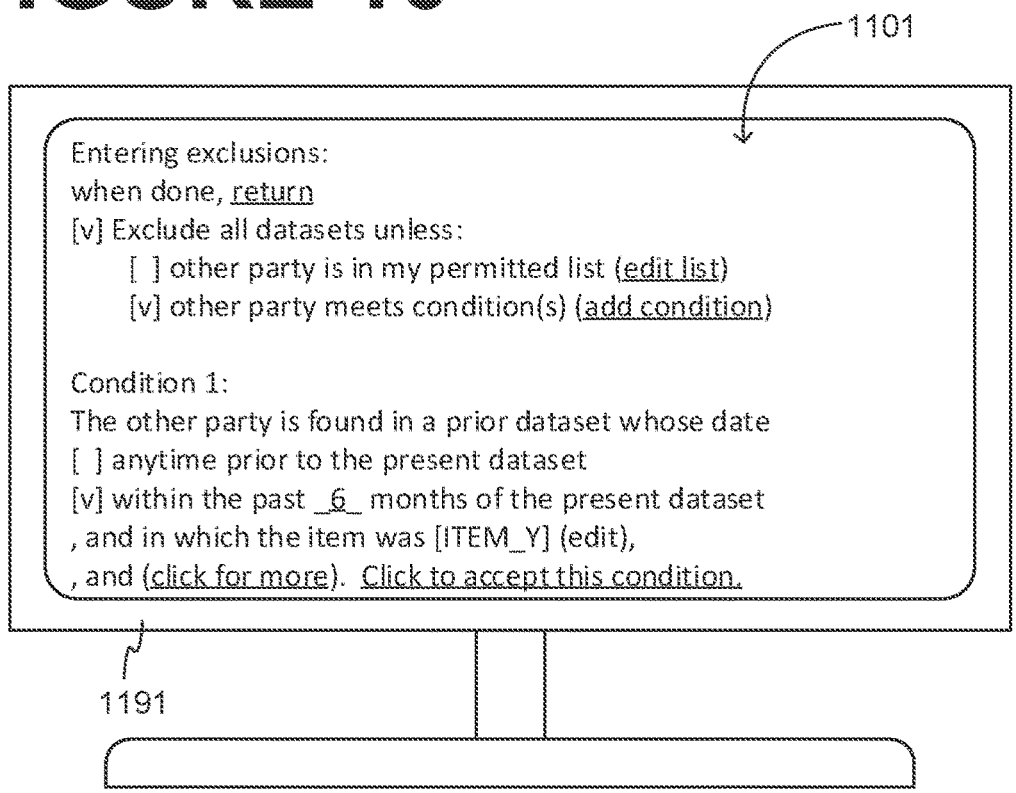
FIG. 11 is a sample view of a User Interface (UI) of a system for applying permission digital rules that provides an option to define a condition for excluding a dataset that is an improvement in automated computerized systems, according to embodiments of the present disclosure.

FIG. 11 is a sample view of a User Interface (UI) 1101 of a system for applying permission digital rules that provides an option to define a condition for excluding a dataset that is an improvement in automated computerized systems, according to embodiments of the present disclosure.

A primary entity may use the UI 1101 displayed by the screen 1191 to enter a condition for PDRs to permit a dataset by excluding all datasets unless the condition is met. For example, the condition depicted in FIG. 11 specifies that the dataset should be excluded unless the secondary entity is included in a prior dataset within the past six months, and where a specific item ("ITEM_Y") is included in the dataset. Thus, a primary entity is able to define conditions based on whether a secondary entity has entered in a transaction before, whether the transaction occurred within a particular time period, whether the item was a certain item, or items, etc. The primary entity may use these conditions to exclude datasets, permit datasets, or both. In particular, in the present example, selectable user interface elements for choosing to exclude all datasets based on conditions are included in UI 1101, where the "Exclude all datasets unless" and "other party meets condition(s)" user interface elements are selected. Additionally, presented in UI 1101, are selectable user interface elements for a user to define conditions for excluding datasets, including a selectable user interface element for specifying that the secondary entity is found in prior dataset, a selectable user interface element for defining a time period to search for the secondary entity, an "edit" selectable user interface element for choosing an item, a "click for more" selectable user interface element for adding additional conditions, and a "click to accept this condition" selectable user interface element for accepting the defined condition. Also presented in UI 1101 is a "return" selectable user interface element which the user may select to indicate that the primary entity has finished adding or editing the list of names or conditions which are used to exclude datasets.

Figure 12:
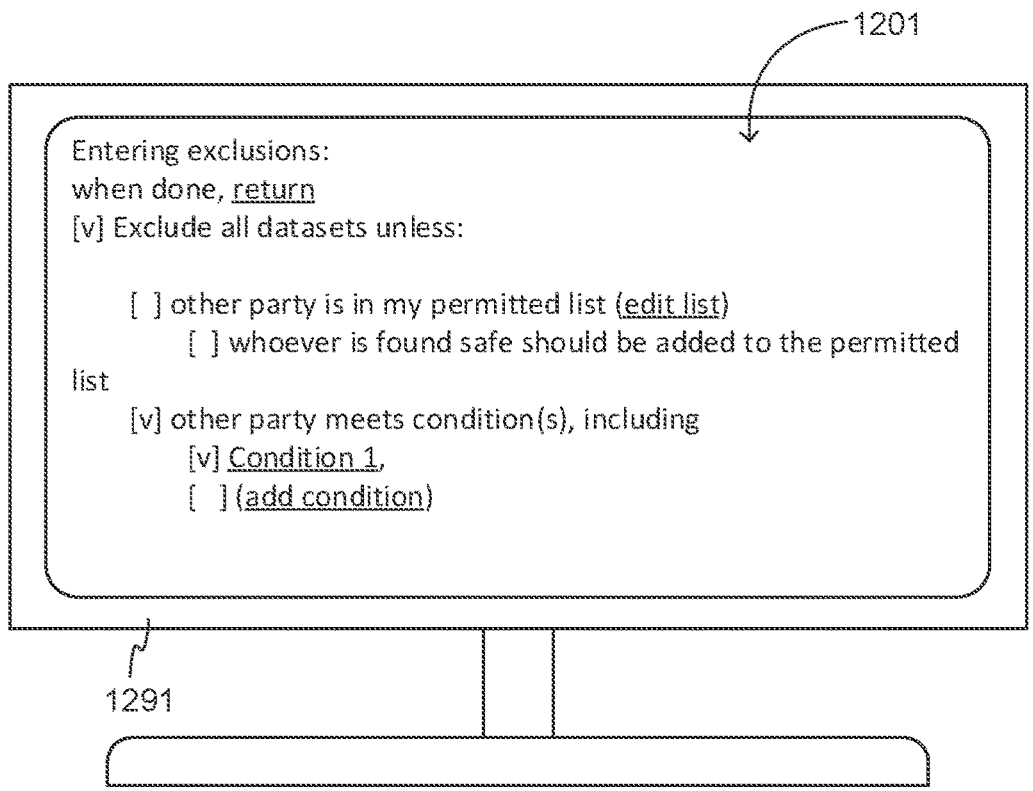
FIG. 12 is a sample view of a User Interface (UI) of a system for applying permission digital rules that provides an option to define additional conditions for excluding datasets and an option to define a permitted list that is an improvement in automated computerized systems, according to embodiments of the present disclosure.

FIG. 12 is a sample view of a User Interface (UI) 1201 of a system for applying permission digital rules that provides an option to define additional conditions for excluding datasets and an option to define a permitted list that is an improvement in automated computerized systems, according to embodiments of the present disclosure.

A primary entity may use the UI 1201 displayed by the screen 1291 to manage the conditions and lists specified in other UIs. For example, in the screen 1291 depicted in FIG. 12, the primary entity can adjust conditions for excluding or permitting datasets, as well as instruct the OSP to automatically include secondary entities which are found "safe," that is, a resource can be produced for a dataset involving the secondary entity, into the permitted list. In particular, in the present example, selectable user interface elements for choosing to permit or exclude all datasets based on conditions are included in UI 1201. Additionally, presented in UI 1201, the "exclude all datasets unless" and "other party meets condition(s), including" selectable user interface elements are checked, indicating that the user intends to exclude all datasets unless one or more conditions apply to the dataset. The UI 1201 additionally includes a selectable user interface element "condition 1" for editing a previously defined condition and a selectable user interface element "add condition" for adding an additional condition. Also presented in UI 1201 is a "return" selectable user interface element which the user may select to indicate that the primary entity has finished adding or editing the list of names or conditions which are used to exclude datasets.

Figure 13:
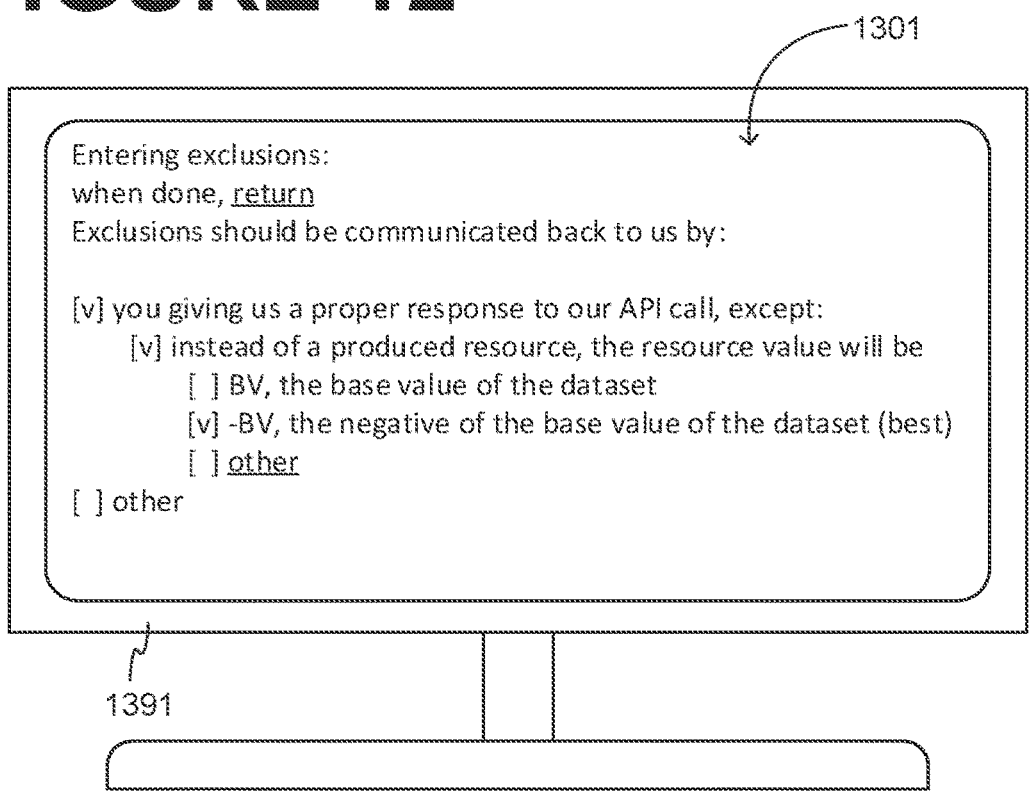
FIG. 13 is a sample view of a User Interface (UI) of a system for applying permission digital rules that provides options to format a response which is transmitted when a dataset is excluded that is an improvement in automated computerized systems, according to embodiments of the present disclosure.

FIG. 13 is a sample view of a User Interface (UI) 1301 of a system for applying permission digital rules that provides options to format a response which is transmitted when a dataset is excluded that is an improvement in automated computerized systems, according to embodiments of the present disclosure.

A primary entity may use the UI 1301 displayed by the screen 1391 to specify how an exclusion is communicated to the primary entity. For example, the UI 1301 may be used to specify that an exclusion should be communicated back to the primary entity by including in the response the base value of the dataset, the negative of the base value of the dataset, or another attribute of the dataset, instead of a produced resource. In various embodiments, other types of responses to communicate the exclusion may be specified by the primary entity, such as sending an error code, null value, etc. In particular, in the present example, are selectable user interface elements for choosing how exclusions are communicated to a primary entity. Presented in UI 1301, selectable user interface elements for a user choose how exclusions are communicated, for example UI 1301 includes options such as "you giving us a proper response to our API call, except:" and "other" represented by selectable UI elements. The "you giving us a proper response to our API call, except" option additionally allows a user to format the option, as indicated by the "instead of a produced resource, the resource value will be," "BV, the base value of the dataset," "−BV, the negative of the base value of the dataset," and "other" (which allows a user to enter another value to be used instead of the produced resource) user interface elements. Also presented in UI 1301 is a "return" selectable user interface element which the user may select to indicate that the primary entity has finished entering how exclusions should be communicated.

In the methods described above, each operation can be performed as an affirmative act or operation of doing, or causing to happen, what is written that can take place. Such doing or causing to happen can be by the whole system or device, or just one or more components of it. It will be recognized that the methods and the operations may be implemented in a number of ways, including using systems, devices and implementations described above. In addition, the order of operations is not constrained to what is shown, and different orders may be possible according to different embodiments. Examples of such alternate orderings may include overlapping, interleaved, interrupted, reordered, incremental, preparatory, supplemental, simultaneous, reverse, or other variant orderings, unless context dictates otherwise. Moreover, in certain embodiments, new operations may be added, or individual operations may be modified or deleted. The added operations can be, for example, from what is mentioned while primarily describing a different system, apparatus, device or method.

A person skilled in the art will be able to practice the present invention in view of this description, which is to be taken as a whole. Details have been included to provide a thorough understanding. In other instances, well-known aspects have not been described, in order to not obscure unnecessarily this description.

Some technologies or techniques described in this document may be known. Even then, however, it does not necessarily follow that it is known to apply such technologies or techniques as described in this document, or for the purposes described in this document.

This description includes one or more examples, but this fact does not limit how the invention may be practiced. Indeed, examples, instances, versions or embodiments of the invention may be practiced according to what is described, or yet differently, and also in conjunction with other present or future technologies. Other such embodiments include combinations and sub-combinations of features described herein, including for example, embodiments that are equivalent to the following: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

A number of embodiments are possible, each including various combinations of elements. When one or more of the appended drawings-which are part of this specification—are taken together, they may present some embodiments with their elements in a manner so compact that these embodiments can be surveyed quickly. This is true even if these elements are described individually extensively in this text, and these elements are only optional in other embodiments.

In general, the present disclosure reflects preferred embodiments of the invention. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the claimed invention.

In this document, the phrases "constructed to," "adapted to" and/or "configured to" denote one or more actual states of construction, adaptation and/or configuration that is fundamentally tied to physical characteristics of the element or feature preceding these phrases and, as such, reach well beyond merely describing an intended use. Any such elements or features can be implemented in a number of ways, as will be apparent to a person skilled in the art after reviewing the present disclosure, beyond any examples shown in this document.

Parent patent applications: Any and all parent, grandparent, great-grandparent, etc., patent applications, whether mentioned in this document or in an Application Data Sheet ("ADS") of this patent application, are hereby incorporated by reference herein as originally disclosed, including any priority claims made in those applications and any material incorporated by reference, to the extent such subject matter is not inconsistent herewith.

Reference numerals: In this description a single reference numeral may be used consistently to denote a single item, aspect, component, or process. Moreover, a further effort may have been made in the preparation of this description to use similar though not identical reference numerals to denote other versions or embodiments of an item, aspect, component or process that are identical or at least similar or related. Where made, such a further effort was not required, but was nevertheless made gratuitously so as to accelerate comprehension by the reader. Even where made in this document, such a further effort might not have been made completely consistently for all of the versions or embodiments that are made possible by this description. Accordingly, the description controls in defining an item, aspect, component or process, rather than its reference numeral. Any similarity in reference numerals may be used to infer a similarity in the text, but not to confuse aspects where the text or other context indicates otherwise.

The claims of this document define certain combinations and sub-combinations of elements, features and acts or operations, which are regarded as novel and non-obvious. The claims also include elements, features and acts or operations that are equivalent to what is explicitly mentioned. Additional claims for other such combinations and sub-combinations may be presented in this or a related document. These claims are intended to encompass within their scope all changes and modifications that are within the true spirit and scope of the subject matter described herein. The terms used herein, including in the claims, are generally intended as "open" terms. For example, the term "including" should be interpreted as "including but not limited to," the term "having" should be interpreted as "having at least," etc. If a specific number is ascribed to a claim recitation, this number is a minimum but not a maximum unless stated otherwise. For example, where a claim recites "a" component or "an" item, it means that the claim can have one or more of this component or this item.

In construing the claims of this document, 35 U.S.C. § 112(f) is invoked by the inventor(s) only when the words "means for" or "steps for" are expressly used in the claims. Accordingly, if these words are not used in a claim, then that claim is not intended to be construed by the inventor(s) in accordance with 35 U.S.C. § 112(f).

The invention claimed is:

1. A system, comprising:
one or more processors; and
one or more non-transitory computer-readable storage media coupled to the one or more processors, the media having stored thereon instructions which, when executed by the one or more processors, result in operations including at least:
transmitting a dataset to an online service platform (OSP), the dataset indicating a proposed relationship instance between a primary entity and a secondary entity involving an item;
receiving, from the OSP, a response, wherein the response includes an indication of whether the dataset is excluded from being used to produce a resource associated with the proposed relationship instance due to the secondary entity being a participant in the proposed relationship instance;
if it is indicated that the dataset is not thus excluded, then:
accessing, from the response, the resource associated with the proposed relationship instance; and
taking an action to facilitate the proposed relationship instance based on the accessed resource; and
else if it is indicated that the dataset is thus excluded, then:
taking an action to prevent the proposed relationship instance from occurring.

2. The system of claim 1, in which the operations further include:
transmitting one or more permission digital rules to the OSP, the permission digital rules being usable to determine whether a dataset is to be excluded from being used to produce the resource associated with the proposed relationship instance due to the secondary entity being a participant in the proposed relationship instance.

3. The system of claim 2, in which the operations further include:
receiving input indicating the one or more permission digital rules.

4. The system of claim 1, in which the operations further include:
transmitting a list of one or more distinguished secondary entities to the OSP, in which the list of one or more distinguished secondary entities is usable to determine whether a dataset is to be excluded from being used to produce the resource associated with the proposed relationship instance due to the secondary entity being a participant in the proposed relationship instance.

5. The system of claim 4, in which the operations further include:
receiving input indicating that another secondary entity is to be added to the list; and
transmitting an indication to the OSP that the secondary entity is to be added to the list, responsive to the input indicating that the other secondary entity is to be added to the list.

6. The system of claim 4, in which the operations further include:
receiving input indicating that another secondary entity is to be removed from the list; and
transmitting an indication to the OSP that the secondary entity is to be removed from the list, responsive to the input indicating that the other secondary entity is to be removed from the list.

7. The system of claim 4, in which the operations further include:
receiving input indicating that another secondary entity is to be removed from the list after a predetermined period of time; and
transmitting an indication to the OSP that the secondary entity is to be removed from the list after the predetermined period of time has elapsed, responsive to the input indicating that the secondary entity is to be removed from the list after a predetermined period of time.

8. The system of claim 1, in which the operations further include:
transmitting a safe list of one or more safe secondary entities deemed safe and that are not to be excluded to the OSP.

9. The system of claim 1, in which the operations further include:
identifying a base value for the generated dataset, based on at least the input indicating the item;
including the base value in the generated dataset; and
receiving the response from the OSP, wherein the response further includes the base value of the dataset.

10. The system of claim 1, in which the operations further include:
identifying a base value for the generated dataset, based on at least the input indicating the item;
including the base value in the generated dataset; and
receiving the response from the OSP, wherein the response further includes a negative of the base value of the dataset.

11. A method in a primary entity computing device, the method including:
transmitting, by the primary entity computing device, a dataset to an online service platform (OSP), the dataset indicating a proposed relationship instance between a primary entity and a secondary entity involving an item;
receiving, from the OSP, a response, wherein the response includes an indication of whether the dataset is excluded from being used to produce a resource associated with the proposed relationship instance due to the secondary entity being a participant in the proposed relationship instance;
if it is indicated that the dataset is not thus excluded, then:
accessing, from the response, by the primary entity computing device, the resource associated with the proposed relationship instance; and
taking an action, by the primary entity computing device, to facilitate the proposed relationship instance based on the accessed resource; and
else if it is indicated that the dataset is thus excluded, then:
taking an action, by the primary entity computing device, to prevent the proposed relationship instance from occurring.

12. The method of claim 11, in which the method further includes:
transmitting, by the primary entity computing device, one or more permission digital rules to the OSP, the permission digital rules being usable to determine whether a dataset is to be excluded from being used to produce the resource associated with the proposed relationship instance due to the secondary entity being a participant in the proposed relationship instance.

13. The method of claim 12, in which the method further includes:
receiving, by the primary entity computing device, input indicating the one or more permission digital rules.

14. The method of claim 11, in which the method further includes:
identifying, by the primary entity computing device, a base value for the generated dataset, based on at least the input indicating the item;
including, by the primary entity computing device, the base value in the generated dataset; and
receiving, by the primary entity computing device, the response from the OSP, wherein the response further includes the base value of the dataset.

15. The method of claim 11, in which the method further includes:
identifying, by the primary entity computing device, a base value for the generated dataset, based on at least the input indicating the item;

including, by the primary entity computing device, the base value in the generated dataset; and receiving, by the primary entity computing device, the response from the OSP, wherein the response further includes a negative of the base value of the dataset.

16. The method of claim 11, in which the method further includes:

identifying, by the primary entity computing device, a base value for the generated dataset, based on at least the input indicating the item;

including, by the primary entity computing device, the base value in the generated dataset; and receiving, by the primary entity computing device, the response from the OSP, wherein the response further includes the base value of the dataset.

17. A non-transitory computer-readable storage medium having computer-executable instructions stored thereon that, when executed by at least one processor, cause a computing system to perform operations including:

transmitting a dataset to an online service platform (OSP), the dataset indicating a proposed relationship instance between a primary entity and a secondary entity involving an item;

receiving, a response from the OSP, wherein the response includes an indication of whether the dataset is excluded from being used to produce a resource associated with the proposed relationship instance due to the secondary entity being a participant in the proposed relationship instance;

if it is indicated that the dataset is not thus excluded, then:
accessing, from the response, the resource associated with the proposed relationship instance; and
taking an action to facilitate the proposed relationship instance based on the accessed resource; and else if it is indicated that the dataset is thus excluded, then:
taking an action to prevent the proposed relationship instance from occurring.

18. The non-transitory computer-readable storage medium of claim 17, in which the operations further include:

transmitting a list of one or more distinguished secondary entities to the OSP, in which the list of one or more distinguished secondary entities is usable to determine whether a dataset is to be excluded from being used to produce the resource associated with the proposed relationship instance due to the secondary entity being a participant in the proposed relationship instance.

19. The non-transitory computer-readable storage medium of claim 18, in which the operations further include:

receiving input indicating that another secondary entity is to be added to the list; and transmitting an indication to the OSP that the secondary entity is to be added to the list, responsive to the input indicating that the other secondary entity is to be added to the list.

20. The non-transitory computer-readable storage medium of claim 18, in which the operations further include:

receiving input indicating that another secondary entity is to be removed from the list; and transmitting an indication to the OSP that the secondary entity is to be removed from the list, responsive to the input indicating that the other secondary entity is to be removed from the list.

21. The non-transitory computer-readable storage medium of claim 18, in which the operations further include:

receiving input indicating that another secondary entity is to be removed from the list after a predetermined period of time; and transmitting an indication to the OSP that the secondary entity is to be removed from the list after the predetermined period of time has elapsed, responsive to the input indicating that the secondary entity is to be removed from the list after a predetermined period of time.

* * * * *